United States Patent
Glick et al.

(10) Patent No.: US 11,775,931 B2
(45) Date of Patent: Oct. 3, 2023

(54) SYSTEM AND ASSOCIATED METHODS FOR APPORTIONMENT OF INVENTORY BETWEEN WAREHOUSE NODES TO ACHIEVE REQUESTED SERVICE LEVELS

(71) Applicant: FLEXE, INC., Seattle, WA (US)

(72) Inventors: David Glick, Seattle, WA (US); Megan M. Quintero, Seattle, WA (US); Karl Siebrecht, Seattle, WA (US)

(73) Assignee: FLEXE, INC., Seattle, WA (US)

( * ) Notice: Subject to any disclaimer, the term of this patent is extended or adjusted under 35 U.S.C. 154(b) by 139 days.

(21) Appl. No.: 16/983,868

(22) Filed: Aug. 3, 2020

(65) Prior Publication Data

US 2022/0036305 A1 Feb. 3, 2022

(51) Int. Cl.
*G06Q 10/0875* (2023.01)
*G06Q 10/0834* (2023.01)
*G06F 16/22* (2019.01)

(52) U.S. Cl.
CPC ..... *G06Q 10/0875* (2013.01); *G06Q 10/0834* (2013.01); *G06F 16/22* (2019.01)

(58) Field of Classification Search
CPC ............ G06Q 10/0875; G06Q 10/0834; G06F 16/22
See application file for complete search history.

(56) References Cited

U.S. PATENT DOCUMENTS

| | | |
|---|---|---|
| 6,151,582 A | 11/2000 | Huang et al. |
| 6,871,140 B1 | 3/2005 | Florance et al. |
| 7,096,193 B1 | 8/2006 | Beaudoin et al. |
| 8,121,876 B1 | 2/2012 | Braumoeller et al. |
| 8,165,904 B2 * | 4/2012 | Srinivasan ............. G06Q 50/04 705/7.11 |
| 8,401,970 B1 * | 3/2013 | Patel ...................... G06Q 20/10 705/35 |
| 8,428,988 B1 | 4/2013 | Braumoeller et al. |

(Continued)

OTHER PUBLICATIONS

International Searching Authority, International Search Report and Written Opinion of PCT/US2021/044189 dated Nov. 19, 2021, 10 pages.

(Continued)

*Primary Examiner* — Florian M Zeender
*Assistant Examiner* — Karma A El-Chanti
(74) *Attorney, Agent, or Firm* — Perkins Coie LLP

(57) ABSTRACT

A system and associated methods for apportioning inventory units between a plurality of warehouse nodes operated by third parties in order to meet desired service levels are provided. In some embodiments, the method includes receiving a placement request for a set of inventory units from a merchant, the placement request including desired service levels for shipment of product to customers. The method includes accessing a database storing a plurality of node data sets, each node data set being associated with a warehouse node. Based on the node data sets and the placement request, a set of warehouse nodes for storing the inventory units is selected and a number of inventory units is apportioned to each selected warehouse node. The method also includes providing placement instructions including the selected warehouse nodes and the number of inventory units to ship to each selected warehouse node.

29 Claims, 9 Drawing Sheets

(56) References Cited

U.S. PATENT DOCUMENTS

| | | | |
|---|---|---|---|
| 8,732,040 | B1 | 5/2014 | Prabhune et al. |
| 9,818,002 | B1 | 11/2017 | Yunes et al. |
| 10,984,378 | B1* | 4/2021 | Eckman ............ G06K 19/06131 |
| 2001/0025268 | A1 | 9/2001 | Hnat |
| 2003/0014291 | A1 | 1/2003 | Kane et al. |
| 2006/0069629 | A1 | 3/2006 | Schweitzer et al. |
| 2006/0085235 | A1 | 4/2006 | Nguyen et al. |
| 2006/0184473 | A1 | 8/2006 | Eder et al. |
| 2007/0011033 | A1 | 1/2007 | Atkinson et al. |
| 2007/0011053 | A1 | 1/2007 | Yap |
| 2008/0086392 | A1* | 4/2008 | Bishop ................. G06Q 10/087 705/28 |
| 2008/0114700 | A1 | 5/2008 | Moore et al. |
| 2009/0125350 | A1 | 5/2009 | Lessing et al. |
| 2009/0171712 | A1 | 7/2009 | Heinrichs et al. |
| 2009/0171814 | A1 | 7/2009 | Geng |
| 2010/0036707 | A1* | 2/2010 | Gilchrist ................ G06Q 30/08 705/28 |
| 2010/0125486 | A1 | 5/2010 | Sinclair et al. |
| 2011/0106295 | A1* | 5/2011 | Miranda ............. B65G 1/1378 700/216 |
| 2012/0030070 | A1 | 2/2012 | Keller et al. |
| 2013/0211870 | A1 | 8/2013 | Lawson et al. |
| 2015/0235170 | A1 | 8/2015 | Wallers |
| 2016/0042312 | A1 | 2/2016 | Siebrecht et al. |
| 2016/0379299 | A1 | 12/2016 | Alizadeh et al. |
| 2017/0124511 | A1* | 5/2017 | Mueller ................. H04W 4/029 |
| 2017/0147964 | A1 | 5/2017 | Kothari et al. |
| 2017/0270470 | A1 | 9/2017 | Yang et al. |
| 2017/0323250 | A1 | 11/2017 | Lindbo et al. |
| 2018/0068255 | A1 | 3/2018 | Hance et al. |
| 2018/0260779 | A1* | 9/2018 | Singh ................. G06Q 30/0282 |
| 2018/0276605 | A1 | 9/2018 | Siebrecht et al. |
| 2018/0349850 | A1* | 12/2018 | Hosoda ............ G06Q 10/08355 |
| 2019/0251502 | A1* | 8/2019 | Fujisawa ............... G06Q 10/08 |
| 2019/0258979 | A1 | 8/2019 | Mulay et al. |
| 2019/0259043 | A1 | 8/2019 | Koneri et al. |
| 2019/0347606 | A1* | 11/2019 | Malecha ............. G06Q 20/203 |
| 2020/0175461 | A1 | 6/2020 | Lu et al. |
| 2020/0380452 | A1* | 12/2020 | Vakhutinsky ...... G06Q 30/0283 |
| 2021/0312377 | A1* | 10/2021 | Wessela ................. G06Q 10/04 |
| 2021/0387805 | A1* | 12/2021 | Singh ............... G06Q 10/06311 |

OTHER PUBLICATIONS

Purchase, et al., "25 Ways to Lower Inventory Costs," Logistics Management, https://logisticsmgmt.com/article/25_ways_to_lower_inventory_costs (Year: 2011), 3 pages.

* cited by examiner

SYSTEM AND ASSOCIATED METHODS FOR APPORTIONMENT OF INVENTORY BETWEEN WAREHOUSE NODES TO ACHIEVE REQUESTED SERVICE LEVELS

BACKGROUND

Owners and operators of commercial warehouse spaces frequently have unused storage capacity but have difficulty finding and coordinating storage with parties that have inventory they wish to store. Excess storage capacity is exacerbated as inventory moves in and out of warehouses at different times, making it difficult to maximize the utilized capacity of the warehouse. Additionally, for merchants that do not have their own warehouse facilities, it can be difficult and time-consuming to find warehouses and carriers that are capable of providing the storage and shipping services they need. It can also be challenging for merchants to determine how to place their inventory closer to customers to reduce shipping times and costs. It would therefore be beneficial to provide improved systems and methods for apportioning inventory between warehouses that are not owned or operated by a merchant.

Figure 1:
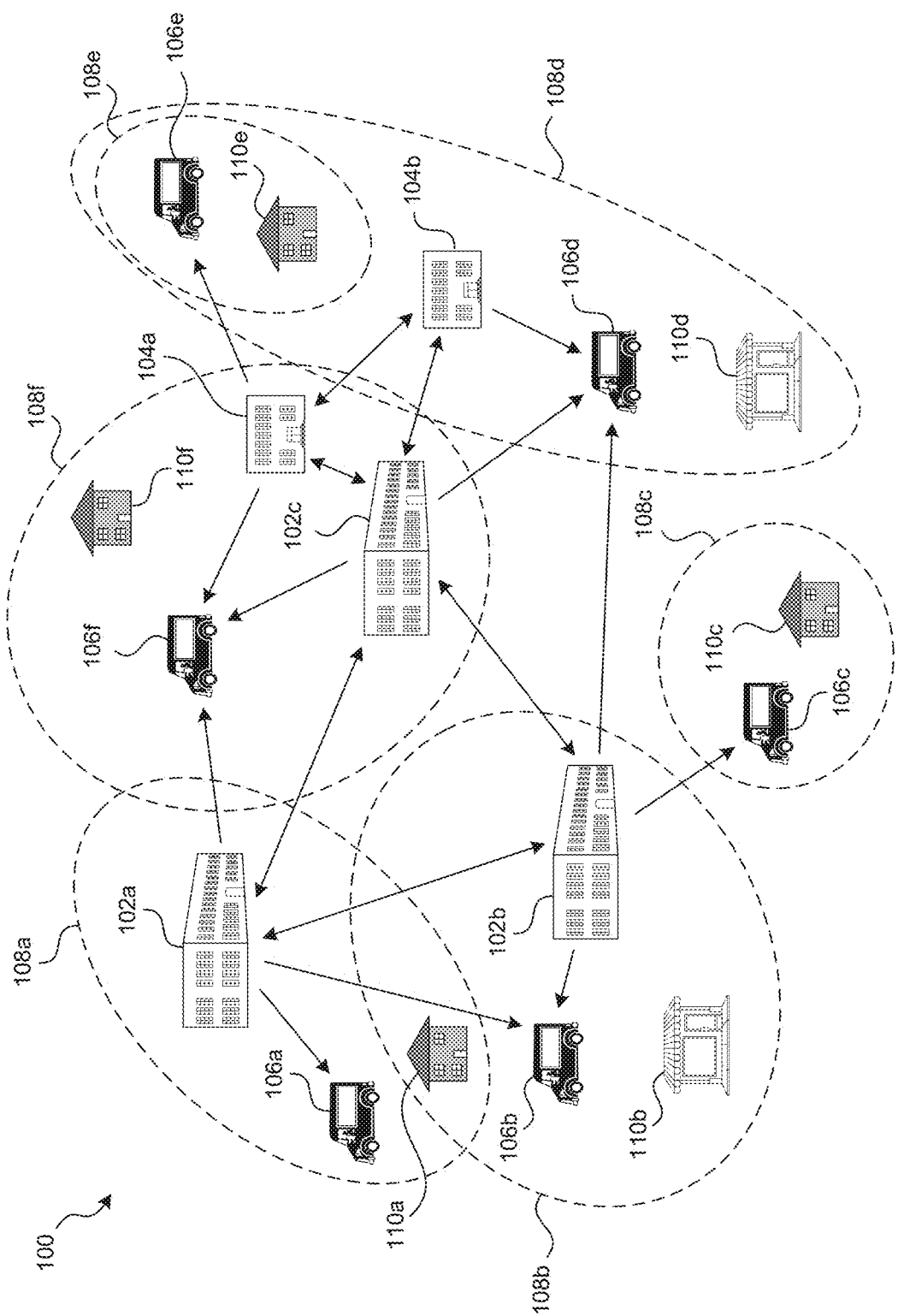
FIG. 1 is a schematic illustration of an exemplary supply chain for movement of inventory from warehouse nodes to customers.

The techniques introduced in this disclosure can be better understood by referring to the following Detailed Description in conjunction with the accompanying drawings.

DETAILED DESCRIPTION

A warehouse network management system that apportions inventory across an extensive network of different warehouse nodes operated by third parties to meet requested service levels, and associated methods are disclosed herein. The system receives a placement request for a set of inventory units from a merchant. The placement request includes one or more service level parameters that characterize the desired delivery performance that the merchant would like to achieve when inventory units are subsequently shipped from warehouses to customers, such as a delivery region and a desired shipping speed to that delivery region. The service level parameters can also include a demand coverage level (e.g., inventory levels sufficient to ship to 90% of the U.S. population within specified timeframes, inventory levels suitable to satisfy 90% of historical order demand, etc.) and/or a fulfillment outcome level (e.g., inventory levels suitable to ensure a 95% probability that an order will be fulfilled without backordering). The deployment request does not include an identification of specific warehouse nodes by the merchant. Based on the service level parameters, the system identifies a set of warehouse nodes operated by third parties for storing the inventory units and apportions a number of inventory units to each selected warehouse node. The identified set of warehouse nodes is selected from an available network of hundreds or thousands of available warehouse nodes. To do so, the system identifies warehouse nodes having available suitable space to store the inventory units and fulfillment capabilities (e.g., access to one or more suitable carriers) to ship inventory from each warehouse node to the requested delivery region within the desired cost and shipping speed constraints. The system provides placement instructions to the merchant including the selected warehouse nodes and the number of inventory units to ship to each selected warehouse node. Optionally, the system operator may instead have the merchant ship to one or more designated warehouse nodes, after which received inventory may be reapportioned by the system between warehouse nodes without knowledge of inventory reapportionment by the merchant.

Various implementations of the system and methods will now be described. The following description provides specific details for a thorough understanding and an enabling description of these implementations. One skilled in the art will understand, however, that the system and methods may be practiced without many of these details or with alternative approaches. Additionally, some well-known structures or functions may not be shown or described in detail so as to avoid unnecessarily obscuring the relevant description of the various implementations. The terminology used in the description presented below is intended to be interpreted in its broadest reasonable manner, even though it is being used in conjunction with a detailed description of certain specific implementations of the system and methods.

FIG. 1 is a schematic illustration of an exemplary supply chain 100 for movement of inventory from warehouse nodes to customers. The supply chain 100 includes a plurality of warehouse nodes 102a-c (e.g., fulfillment centers (FCs), distribution centers (DCs)) that receive and store inventory from a plurality of different merchants (not shown). The transfer of inventory from a merchant to a warehouse node may be referred to herein as an "inbound" transfer. The warehouse nodes 102a-c can be geographically distributed such that each warehouse node is located in a different geographic region (e.g., different neighborhood, city/town, county, area code, state, region, country, etc.). A warehouse node can operate as a single independent facility (e.g., warehouse nodes 102a, 102b), or can operate according to a hub-and-spoke model, e.g., (e.g., warehouse node 102c serves as a centralized "hub" for receiving and routing inventory to satellite "spoke" warehouse nodes 104a-b). Inventory can be transferred between warehouse nodes 102a-c, between hub warehouse node 102c and its spoke warehouse nodes 104a-b, and/or between spoke warehouse nodes 104*a-b*. The transfer of inventory between warehouse nodes may be referred to herein as an "internal" or "FC-to-FC" transfer.

The supply chain 100 includes a large number of warehouse nodes, such as hundreds or thousands of warehouse nodes. The operator of the warehouse network management system described herein does not own, lease, operate, or otherwise directly control any of the warehouse nodes. Instead, the warehouse nodes are owned and operated by third party warehouse operators. Different warehouse nodes may be owned and operated by different warehouse operators. For example, warehouse nodes 102*a-c* may be owned and operated by one, two, or three operators. Different warehouse operators may have different procedures for receiving, storing, and shipping inventory, and may use different software and hardware systems to operate their warehouse nodes. As such, merchants seeking to utilize the warehouse nodes for the shipment of their own goods face a daunting coordination and management challenge. As described in greater detail below, the warehouse network management system provides a unified technology platform for interfacing with large numbers of third party-operated warehouse nodes, thus allowing merchants to conveniently and dynamically leverage the capabilities of the full warehouse node network for inventory management and order fulfillment.

The supply chain 100 includes a plurality of carriers 106*a-f* that receive and deliver inventory stored in the warehouse nodes to a plurality of different delivery regions 108*a-f* and customers 110*a-f*. The transfer of inventory from a warehouse node to a customer may be referred to herein as an "outbound" transfer. Each carrier provides shipping services to a respective delivery region utilizing a certain shipping speed, e.g., carrier 106*a* ships to delivery region 108*a* with delivery to customers within a certain time frame A, carrier 106*b* ships to delivery region 108*b* with delivery to customers within a certain time frame B, etc. The size and/or location of the delivery region can vary from carrier to carrier such that different carriers provide shipping services to different geographic regions, each having certain shipping speeds. Some carriers may provide shipping speeds and/or other services or guarantees that are not provided by other carriers. Some carriers can serve delivery regions identical or similar to the delivery regions served by other carriers, with the same or different shipping speeds for each of those regions. There can be some degree of overlap between delivery regions (e.g., delivery region 108*a* partially overlaps delivery region 108*b*). Conversely, some delivery regions may not overlap with any other delivery region (e.g., delivery region 108*c*). Optionally, a larger delivery region served by a carrier can completely encompass a smaller delivery region served by another carrier (e.g., delivery region 108*d* encompasses delivery region 108*e*).

For purposes of this description, a shipping speed associated with a carrier indicates that the carrier has a high statistical likelihood (e.g., at least a 75%, 90%, 95%, or 99% likelihood) of being able to deliver to a particular location within the corresponding timeframe specified in received service level parameters (e.g., 12-hour, same-day, 1-day, or 2-day delivery). It will be appreciated that the shipping speed specified in service level parameters may or may not directly correspond to the shipping options for carriers advertised as having the same speed. For example, the system may map a 2-day service level parameter to a 3-day shipping option of a carrier if the carrier has consistently been able to deliver to the specified region within 2 days (i.e., in a quicker manner than advertised by the carrier).

The delivery regions 108*a-f* include a plurality of customers 110*a-f* that can receive inventory from the merchants. Customers 110*a-f* can include individual consumers that purchase inventory units from the merchants (e.g., customers 110*a*, 110*c*, and 110*f*) as well as retail stores that sell inventory to consumers (e.g., customers 110*b* and 110*d*). The customers 110*a-f* are geographically distributed among the delivery regions 108*a-f* such that different customers are served by different carriers. A customer located in multiple delivery regions can receive shipments from multiple carriers, e.g., customer 110*a* is located in delivery regions 108*a-b* and can receives shipments from carriers 106*a-b*. Carriers 106*a* and 106*b* may offer delivery to customer 110*a* within a similar time frame, e.g., within 2 days. Or carriers 106*a* and 106 may offer delivery to customer 110*a* within different time frames, for example carrier 106*a* may be able to deliver to customer 110*a* within 1 day of receipt of order, whereas carrier 106*b* may be able to deliver to customer 110*a* within 2 days of receipt of order. A customer located in a single delivery region can receive shipments from a single carrier, e.g., customer 110*c* is located in a single delivery region 108*c* and receives shipments only from carrier 106*c*.

In the supply chain 100, each warehouse node is served only by certain carriers. For example, warehouse node 102*a* is served by carriers 106*a*, 106*b*, and 106*f*; warehouse node 102*b* is served by carriers 106*b*, 106*c*, and 106*d*; warehouse node 102*c* is served by carriers 106*d* and 106*f*; subsidiary warehouse node 104*a* is served by carriers 106*e* and 106*f*; and subsidiary warehouse node 104*b* is served by carrier 106*d*. As a result, a warehouse node can ship inventory only to customers located in the delivery regions served by its carrier(s). For example, warehouse node 102*a* can ship inventory to customers 110*a-b* and 110*f*, but not to customers 110*c-e*.

A merchant may want to ship inventory to its customers according to one or more parameters specifying the desired outcome and/or performance of shipping services, also referred to herein as "service level parameters." Service level parameters can include, for example, a delivery region (e.g., one or more zip codes) where inventory, is to be shipped to customers utilizing a desired shipping speed (e.g., 12-hour, same-day, 1-day, or 2-day shipping), a shipping cost for each shipment (e.g., free shipping, flat-rate shipping), a customer segment to receive the shipments (e.g., a segment based on purchase behavior, loyalty programs, region, demographics, etc.), a desired customer experience associated with receiving the shipped inventory units (e.g., white-glove service to deliver the shipped inventory to a particular room of a house or apartment), a demand coverage level (e.g., a specified percent of the customer population or of historical demand), and/or performance level (e.g., a specified percent of successfully fulfilled orders). For example, a merchant may wish to provide 2-day shipping of inventory to 95% of its customers in the United States. As another example, a merchant may wish to ensure that 90% of its customer orders can be successfully fulfilled without any backorder or stockout.

In some situations, however, the dynamics and interrelationships of the supply chain may be unknown or unclear to the merchant. For example, the merchant may not know which warehouse nodes are served by carriers that can deliver to the targeted delivery region with the desired shipping cost and speed. Additionally, a merchant may not know how to best delegate orders to the appropriate warehouse node(s) for fulfillment, and the carriers to be used for delivering each order to the customer to meet the specified service level parameters. As a result, it can be difficult for merchants to determine where they should have warehouse nodes for storing inventory, as well as how to best apportion their inventory between multiple warehouse nodes to achieve the desired service level parameters when fulfilling customer orders.

The system for warehouse network management described herein can determine an optimal and/or improved apportionment of inventory units between multiple warehouse nodes based on service level parameters requested by a merchant. In some embodiments, the warehouse network management system herein determines how inventory is to be apportioned between warehouse nodes without requiring, requesting, or otherwise having the merchant select the warehouse nodes and/or the locations of the warehouse nodes. Instead, the merchant can simply submit a placement request that specifies a desired delivery service level for that inventory (e.g., in terms of service level parameters), and the system determines the appropriate warehouse nodes that would achieve that outcome if inventory were stocked in those nodes. For example, rather than having the merchant select a particular facility and/or location where the inventory is to be stored (e.g., "Warehouse X at 1234 Main Street"), the merchant can simply specify a desired delivery region (e.g., "California") and a desired shipping speed to customers in that region, and the system automatically determines which warehouse nodes have space availability, are suitable for storing the inventory units, and would be capable of shipping to that region in order to have the shipped products delivered to customers at the desired shipping speed or at a speed better than the desired shipping speed. As another example, the merchant can simply request a desired demand coverage level (e.g., "90% of my historical demand"), and the system can, using historical demand data from the merchant, automatically determine the appropriate number and locations of warehouse nodes, as well as the amount of inventory to be sent to each warehouse node, to maintain sufficient inventory levels to fulfill the request.

Additionally, the system herein can automatically and dynamically reapportion inventory between warehouse nodes (e.g., to accommodate changes in inventory levels, customer demand, shipping interruptions, time-bound campaigns, etc.), without requiring, requesting, or otherwise having the merchant determine how to reapportion the inventory, and in some cases without even notifying the merchant that reapportionment has occurred. Accordingly, the warehouse network management system herein can apportion and/or reapportion inventory to meet the merchant's service level parameters while the node level parameters (e.g., warehouse node locations, carriers serving the warehouse node, locations of inventory, etc.) remain opaque or otherwise unknown to the merchant. The system described herein is expected to simplify inventory management for merchants and improve the efficiency of inventory apportionment and fulfillment of customer orders, while attempting to ensure that the desired service levels to customers are being met.

Figure 2A:
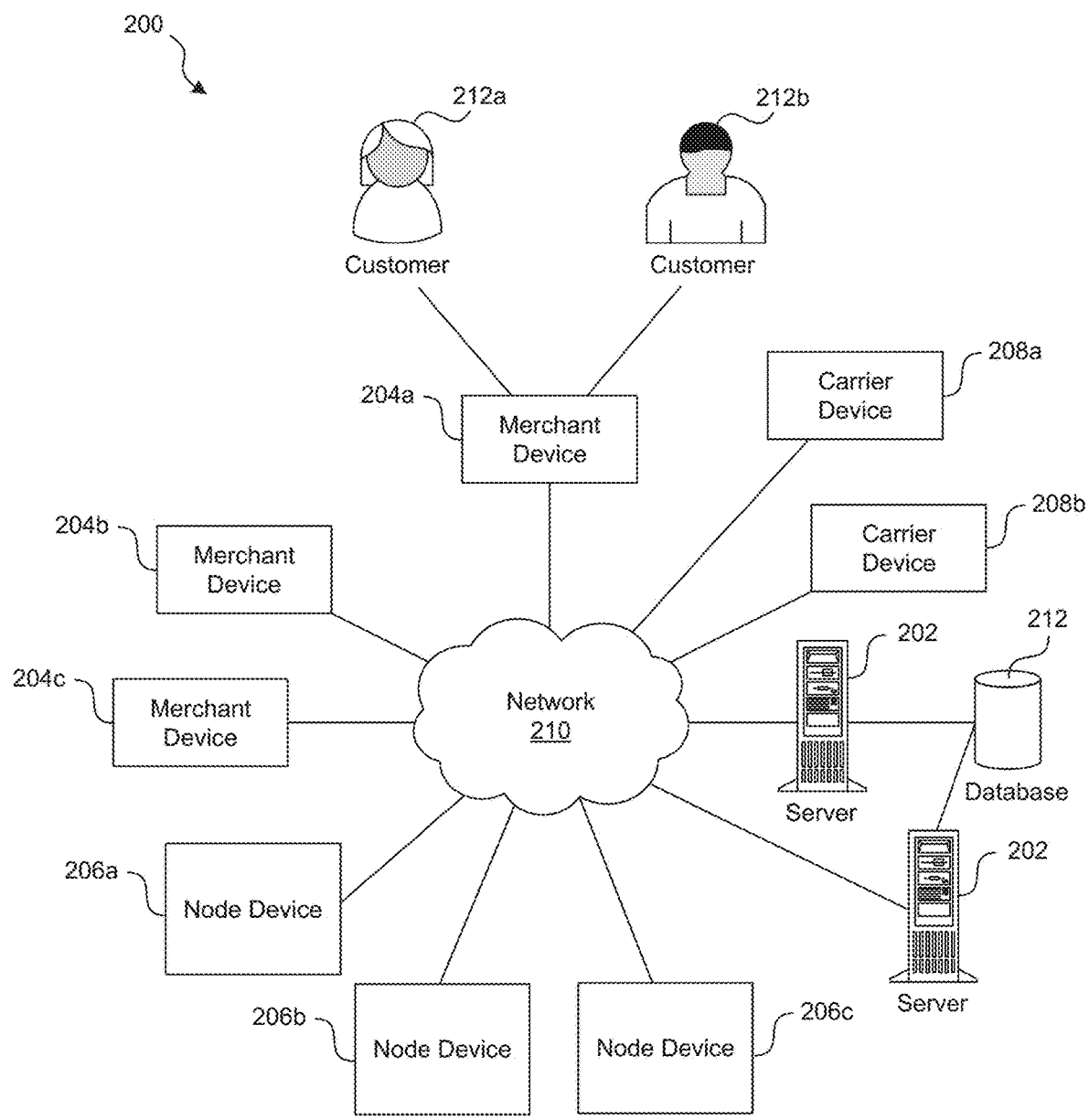
FIG. 2A is a network diagram illustrating an exemplary computing environment in which a warehouse network management system operates.

FIG. 2A is a network diagram illustrating an exemplary computing environment 200 in which a warehouse network management system operates. Although not required, aspects of the system are described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the term "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the system can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the system described herein may be stored or distributed on tangible, non-transitory computer-readable media, including magnetic and optically readable and removable computer discs, stored in firmware in chips (e.g., EEPROM chips). Alternatively, aspects of the system may be distributed electronically over the Internet or over other networks (including wireless networks). Those skilled in the relevant art will recognize that portions of the system may reside on a server computer, while corresponding portions reside on a client computer.

The environment 200 includes server computers 202 ("servers"), a plurality of merchant devices 204a-c, a plurality of node devices 206a-c, and a plurality of carrier devices 208a-b that communicate with each other through a network 210. The network 210 can be a LAN or a WAN, and can include wired or wireless network elements. In some embodiments, the network 210 is the Internet or some other public or private network.

The merchant devices 204a-c are computing devices operated by or otherwise associated with different merchants. Each merchant device can receive product orders from customers (e.g., customers 212a-b). The product orders can be received directly at the merchant devices 204a-c (e.g., in-person or telephone orders) or can be communicated to the merchant devices 204a-c via the network 210. To fulfill received or projected future customer orders, the merchant devices 204a-c can send requests to the servers 202 for deploying inventory to warehouse nodes (inbound transfers), transferring inventory between warehouse nodes (internal transfers), and/or shipping inventory from warehouse nodes to customers (outbound transfers). Optionally, the placement requests can be based on other factors, such as current and/or projected customer demand, current and/or upcoming sales events, product launch plans, etc. The merchant devices 204a-c can also provide other information to the servers 202 that may be useful in fulfilling the placement request, such as demand data (e.g., historical or anticipated demand data). The servers 202 can process the placement request and/or additional information to determine how to distribute or redistribute inventory between warehouse nodes to fulfill the request, as described in greater detail below. In some embodiments, merchant devices associated with different merchants provide information to the servers 202 in disparate, non-standardized formats (e.g., based on the software and/or hardware platforms used by the corresponding merchant), and the servers 202 convert the information to a standardized format suitable for use in the various operations described herein (e.g., apportioning inventory across warehouse nodes in response to placement requests).

The node devices 206a-c are computing devices operated by or otherwise associated with different warehouse nodes. Each node device can send information regarding the corresponding warehouse node to the servers 202. Warehouse node information can include, for example, facility information, availability of storage space, pricing, carrier information, performance information, and inventory information. The servers 202 can process and/or store the received warehouse node information in a database 212, as described in greater detail below. For purposes of this description, a database is any data structure that allows for the relational or non-relational storage of data, including flat files. Node devices associated with different warehouse nodes may provide warehouse node information to the servers 202 in disparate, non-standardized formats (e.g., based on the software and/or hardware platforms used by the corresponding warehouse node operator), and the servers 202 can convert the information to a standardized format suitable for use in the various operations described herein (e.g., selecting warehouse nodes for inventory placement and/or transfers). The node devices 206a-c can also receive instructions or other information from the servers 202 in connection with placement requests from merchants. For example, once a particular shipment of inventory has been assigned and/or routed to a warehouse node (e.g., as part of an inbound transfer or internal transfer), the servers 202 can send instructions to the corresponding node device for receiving that shipment. As another example, if inventory is to be transferred out of a warehouse node (e.g., as part of an internal or outbound transfer), the servers 202 can send instructions to the corresponding node device for preparing that inventory for shipment.

The carrier devices 208a-b are computing devices operated by or otherwise associated with different carriers. In some embodiments, the carrier devices 208a-b communicate with the merchant devices 204a-c, the node devices 206a-c, and/or the servers 202 (e.g., via network 210) to coordinate shipments of inventory from merchants to warehouse nodes (inbound transfers), between warehouse nodes (internal transfers), and/or from warehouse nodes to customers (outbound transfers). For example, the servers 202 can send instructions or other information to a carrier device in connection with a shipment to be handled by the corresponding carrier. The instructions can specify the origin, destination, weight, service level, etc. to allow the carrier to schedule and implement the specified shipment. Optionally, the carrier devices 208a-b can also send information to the servers 202. The carrier information can include, for example, delivery regions served by the carrier, shipping speed, handling options, pricing, time periods when the carrier is available for delivery, and performance information. The servers 202 can process and/or store the received carrier information in database 212, as described in greater detail below. Carrier devices associated with different carriers may provide carrier information to the servers 202 in disparate, non-standardized formats (e.g., based on the software and/or hardware platforms used by the corresponding carrier), and the servers 202 convert the information to a standardized format suitable for use in the various operations described herein (e.g., identifying carriers capable of providing requested shipping services).

As will be described in additional detail herein, servers 202 receive inventory placement requests from the merchant devices 204a-c, and determine how inventory should be apportioned between warehouse nodes to fulfill the requests based on the warehouse node information and/or carrier information stored in the database 212, and optionally based on additional information received from the merchant devices 204a-c (e.g., demand data). In some embodiments, a placement request from a merchant device includes one or more service level parameters (e.g., delivery region, shipping speed, shipping cost, customer segment, anticipated shipping time frame, demand coverage level, performance level), and the servers 202 select warehouse nodes that are capable of meeting at least some or all of the service level parameters. Once the apportionment has been determined, the servers 202 can send placement instructions to the merchant device with information on the selected warehouse nodes and the amount of inventory to ship to each warehouse node (inbound transfers). Alternatively or in combination, the servers 202 can effectuate the apportionment by transferring inventory that is already at a warehouse node to one or more different warehouse nodes (internal transfers).

After the inventory is received by the selected warehouse nodes, the servers 202 can monitor inventory levels at each warehouse node. The servers 202 can determine whether inventory should be reapportioned, e.g., based on information received from the node devices 206a-c (e.g., whether inventory levels are too high or too low) and/or the merchant devices 204a-c (e.g., whether there are changes in customer demand, product launch plans, etc.). If the servers 202 determines that reapportionment is necessary or beneficial, it can determine how the inventory should be reapportioned between the warehouse nodes and transmit reapportionment instructions to the node devices 206a-c and/or carrier devices 208a-b. In some embodiments, the reapportionment process is performed without receiving instructions or other input from the merchant devices 204a-c. In other embodiments, the merchant devices 204a-c can instruct the servers 202 to reallocate inventory or otherwise provide input indicating that reapportionment should be performed (e.g., by transmitting information regarding changing demand levels, etc.), but without providing instructions as to how the reapportionment should be performed (e.g., which warehouse nodes, how many inventory units, etc.). An additional description of how the servers 202 apportion and reapportion inventory is provided below.

Figure 2B:
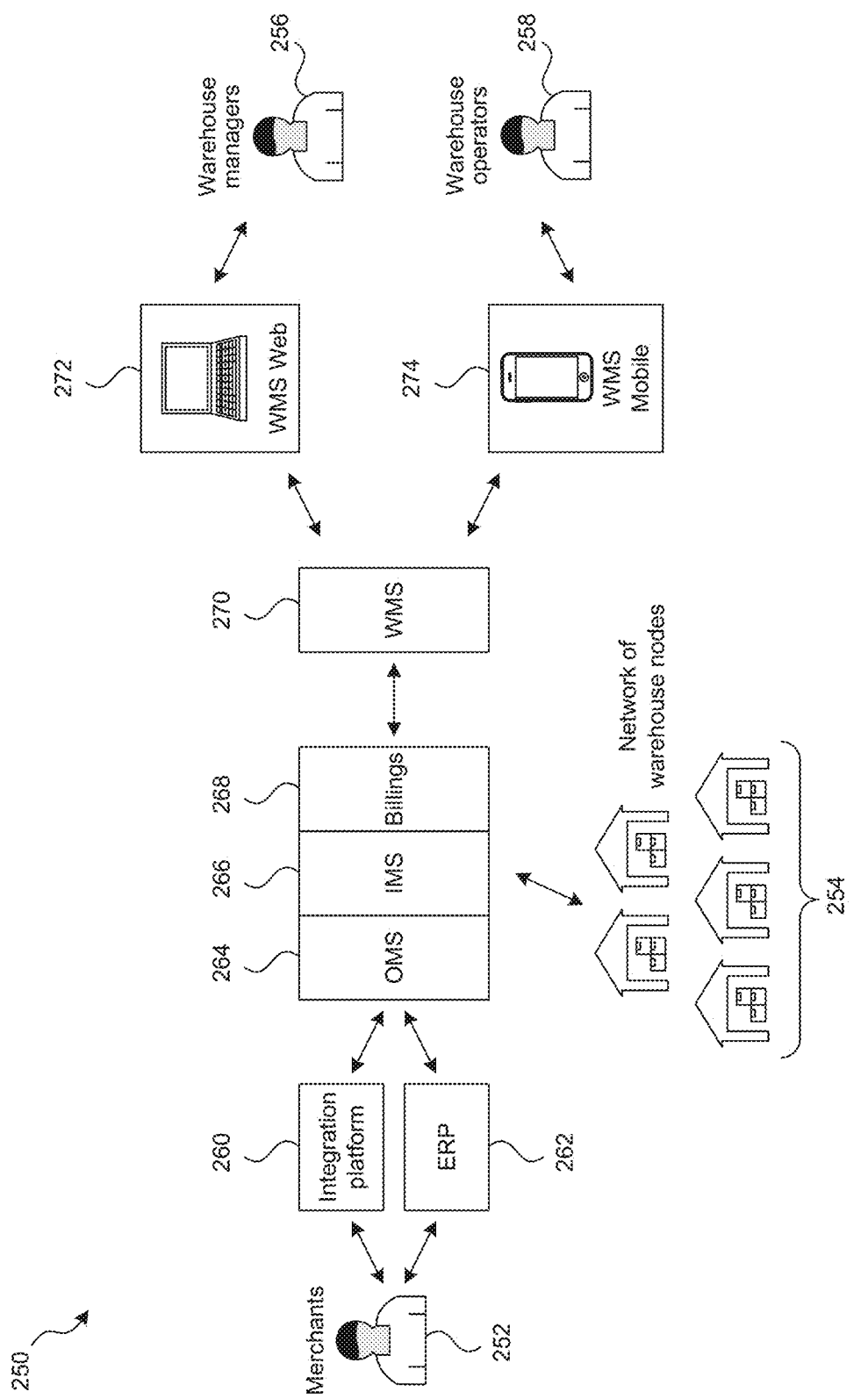
FIG. 2B is a schematic illustration of an exemplary computing architecture for a warehouse network management system.

FIG. 2B is a schematic illustration of an exemplary computing architecture for a warehouse network management system 250. The system 250 can operate within the computing environment 200 described with respect to FIG. 2A. For example, some or all of the components of the system 250 can be implemented by the servers 202 of FIG. 2A. The system 250 provides a single unified technology platform that interfaces between merchants 252, a network of warehouse nodes 254, warehouse managers 256, and warehouse operators 258. In the illustrated embodiment, the system 250 includes an integration platform 260, an enterprise resource planning (ERP) application 262, an order management system (OMS) layer 264, an inventory management system (IMS) layer 266, a billings layer 268, a warehouse management system (WMS) 270, a WMS web application 272, and a WMS mobile application 274.

A merchant 252 can access the system 250 through the integration platform 260 and ERP 262. The integration platform 260 is configured to communicate various types of information between the merchant 252 and the system 250. For example, the integration platform 260 can implement one or more application programming interfaces (APIs) or other software components configured to receive various types of data from the merchant 252, such as data regarding inbound transfers of inventory (e.g., type of inventory, amount of inventory, how the inventory is packaged, where the inventory is to be delivered), outbound orders (e.g., order volume, shipment destinations, shipping speeds, etc.), or any other information relevant to inventory management. The integration platform 260 can also be configured to provide various types of data to the merchant 252, such as confirmations (e.g., that an inbound transfer was received, that an outbound order was fulfilled), notifications, alerts, or any other relevant information.

The ERP application 262 provides a user interface (UI) for the merchant 252 to view and manage the status of the inventory stored in the warehouse nodes 254. For example, the ERP application 262 can connect the merchant 252 to the OMS layer 264 so that the merchant can view information regarding outbound orders for the stored inventory (e.g., order status) and/or manage the orders (e.g., input new orders, cancel existing orders, etc.). In some embodiments, the OMS layer 264 differentiates between orders received through different channels (e.g., retail, e-commerce, hybrid, etc.) so that the merchant 252 can view and manage orders separately based on the channel. The ERP application 262 can also connect the merchant 252 to the IMS layer 266 so that the merchant can view information regarding the stored inventory (e.g., inventory levels, locations, status) and/or manage the inventory (e.g., request an inbound or internal transfer). The ERP application 262 can also connect the merchant 252 to the billings layer 268 so the merchant 252 can view information regarding costs (e.g., inbound transfer costs, storage costs, pick and pack costs, shipping costs, etc.). Costs may be charged to the merchant, for example, in a transaction-based manner (e.g., per each inbound, internal, or outbound transfer).

The system 250 communicates information between the OMS layer 264, IMS layer 266, and billings layer 268 to the WMS 270. The WMS 270 can be used to manage warehouse operations for each of the warehouse nodes 254. For example, the WMS 270 can transmit information to a warehouse manager 256 (e.g., via the WMS web application 272) relating to administration of inventory stored at a warehouse node 254. The information can include, for example, an outbound order for the inventory, an inbound or internal transfer of inventory to be delivered to the warehouse node 254, and the like. The warehouse manager 256 can also transmit information to the WMS 270 (e.g., confirmation that an outbound order was fulfilled, that an inbound or internal transfer was received, etc.). The WMS 270 can also transmit information to a warehouse operator 258 (e.g., via the WMS mobile application 274) relating to specific tasks to be performed with respect to inventory stored at a warehouse node 254. For example, when an outbound order is received by the WMS 270, the WMS 270 can send instructions to the warehouse operator 258 to select, package, and ship inventory to fulfill the order. The warehouse operator 258 can also send information to the WMS 270 (e.g., confirmation that an outbound shipment was prepared). In some embodiments, the OMS layer 264 coordinates with the WMS 270 to control and manage the timing of inventory-related operations. For example, the OMS layer 264 can delegate orders to the WMS 270 at certain times, e.g., to comply with the merchant's desired delivery window. The OMS layer 264 can optionally place orders in a prioritized queue to fulfill desired service levels (e.g., orders for certain customer segments such as first-time customers or loyalty program customers are prioritized over other orders).

As can be seen in FIG. 2B, the system 250 allows merchants 252 to access and manage inventory across a large number of different warehouse nodes 254 (e.g., hundreds or thousands of warehouse nodes) through a single technology platform. The system 250 can also coordinate between multiple different entities (warehouse managers 256, warehouse operators 258) on behalf of the merchants 252 to manage inventory placement, balancing, and allocation against customer orders. Additionally, in some embodiments, the system 250 also interfaces with carriers (not shown) to manage and delegate inventory transfers (e.g., inbound, internal, and/or outbound transfers) to and/or from any of the warehouse nodes 254 in the network. Because of the complexity associated with managing inventory associated with many different merchants across hundreds or thousands of warehouse nodes, the techniques described herein are not suitable for implementation using manual warehouse management techniques. Moreover, because the warehouse nodes may be operated by hundreds or thousands of different owners, traditional warehouse management systems used to manage each warehouse node would not have had access to data from other warehouse nodes managed by different operators in order to implement the functionality described herein.

Figure 3A:
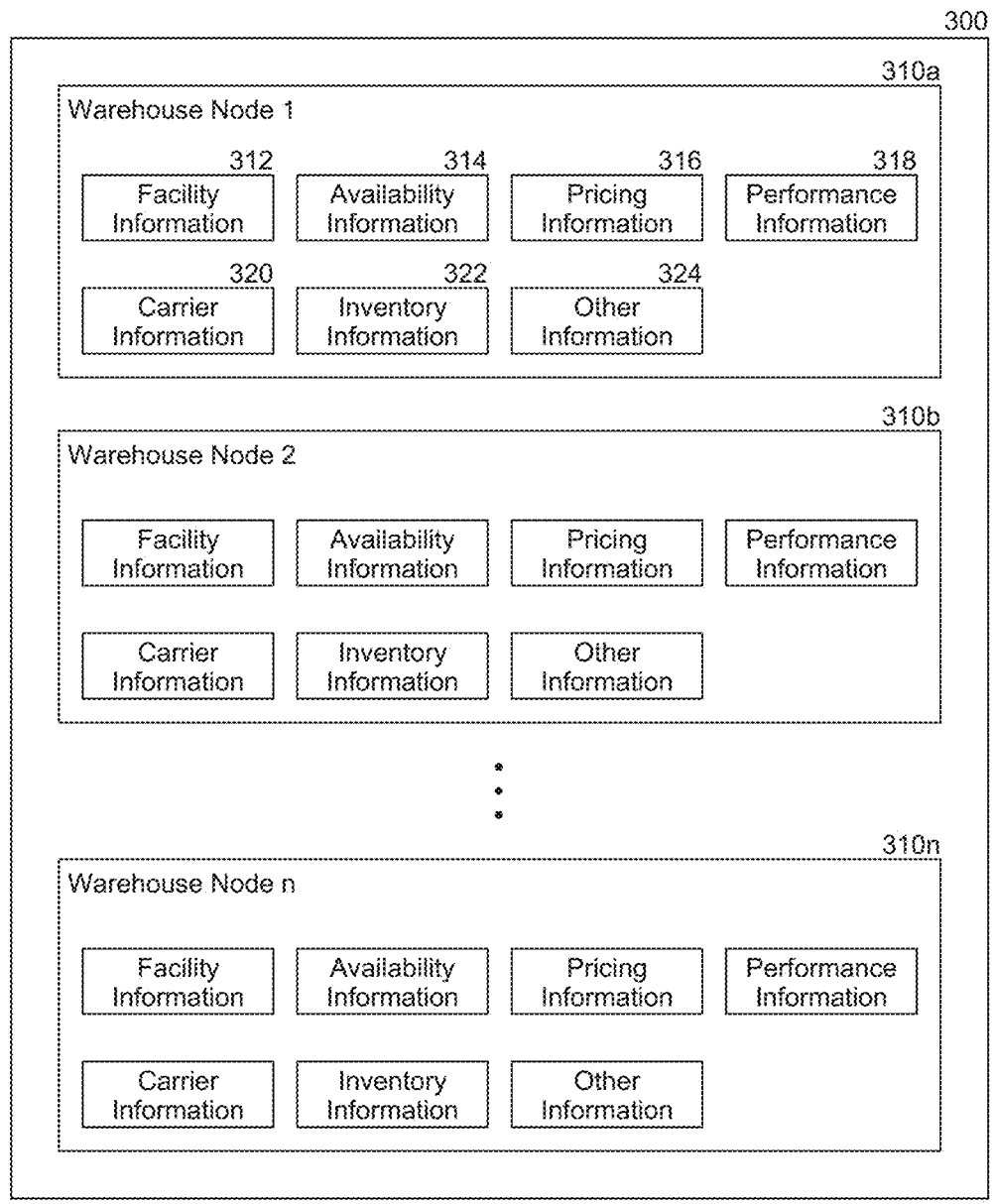
FIG. 3A is a schematic illustration of an exemplary data structure for storing warehouse node information.

FIG. 3A is a schematic illustration of an exemplary data structure 300 for storing warehouse node information. The data structure 300 is generated and/or accessed by a warehouse network management system. For example, the data structure 300 can be incorporated in the database 212 described with respect to FIG. 2A. The data structure 300 includes a plurality of node data sets 310*a-n*. Each node data set stores information for a corresponding warehouse node, such as facility information 312, availability information 314, pricing information 316, performance information 318, carrier information 320, inventory information 322, and/or other information 324. Each node data set can store warehouse node information in a standardized format so the warehouse network management system can easily search and analyze the information, e.g., to perform the inventory placement processes described herein. The data structure 300 can be used to store data for a very large number of warehouse nodes. In some embodiments, for example, the data structure 300 includes node data sets that represent at least 10, at least 50, at least 100, at least 500, at least 1000, or at least 5000 different warehouse nodes.

Facility information 312 can include any information relevant to the storage facilties at the warehouse node, such as location (e.g., address, time zone), storage capacity (e.g., in pallets, square feet, or other units of measurement), storage parameters (e.g., maximum and/or minimum dimensions, weights), the types of inventory the warehouse node handles (e.g., alcohol, apparel, appliances, automotive, chemicals, consumer goods, electronics, etc.), facility parameters (e.g., whether racking is available, whether there are dock-high doors, the number of dock doors), operating hours, security systems and/or procedures (e.g., whether there is an alarm system, whether there are security cameras, whether background checks are required for staff, whether facility access is controlled), fire prevention systems and/or procedures (e.g., whether there is a sprinkler system), handling requirements and/or qualifications (e.g., refrigeration capability, food handling qualifications, pharmaceutical handling qualifications, hazardous material handling qualifications, BRC storage and distribution certification, FDA certification), insurance coverage, services provided (e.g., pick/pack individual orders, kitting, assembly, etc.), and the like.

Availability information 314 can include any information relevant to the availability of storage space at the warehouse node, such as location of available space within the facility, size of the available space (e.g., in pallets, racks, square feet, or other units of measurement), storage parameters for the available space (e.g., maximum and/or minimum dimensions, weights, etc.), the time period of availability (e.g., hours, days, weeks, months), and the like. Availability information 314 can also include information relevant to the operating hours for the warehouse node (e.g., start and end times for receiving shipments, whether the warehouse node is open on weekends, time zone, etc.).

Pricing information 316 can include any information relevant to prices for storing and/or handling inventory at the warehouse node, such as prices per unit (e.g., per pallet, per square foot), prices per time period (e.g., per day, week, month), prices for special handling (e.g., for refrigeration, food handling, pharmaceutical handling), prices for add-ons or other services, available discounts (e.g., for merchants with high-volume and/or long-term storage needs), prices for preparing inventory for shipment (e.g., pick and pack prices) and the like.

Performance information 318 can include any information relevant to the quality of services provided by the warehouse node, such as historical data (e.g., amounts, types, dates, etc. of previous inventory stored at the warehouse node), feedback (e.g., from merchants or other users that have stored inventory or otherwise interacted with the warehouse node), quality ratings or scores, incident reports, insurance claims, and the like.

Carrier information 320 can include any information relevant to the carriers that deliver from the warehouse node, such as the names of the carriers, contact information, delivery regions, pick-up regions, shipping speed, pricing information, handling options, availability information, performance information, and the like. Additional examples of carrier information are described in greater detail below.

Inventory information 322 can include any information relevant to the inventory currently stored at the warehouse node, such as levels or amounts (e.g., in pallets, number of inventory units), the merchant owning the inventory, location within the facility, start date of the storage period, expected end date of the storage period, special handling instructions, and the like. In some embodiments, inventory information 322 also includes information regarding availability of inventory (e.g., whether inventory is available to be allocated against an outbound order, whether the inventory is damaged or otherwise unavailable, etc.).

Other information 324 can include any other warehouse node information suitable for use with the embodiments described herein.

It will be appreciated that the data structure 300 illustrated in FIG. 3A can be arranged differently in other embodiments. For example, some of the fields of data structure 300 can be combined with each other. Additionally, some of the fields of data structure 300 can be divided into subfields. Any of the warehouse node information described with respect to FIG. 3A can be stored in any suitable format, e.g., tables, arrays, matrices, maps, charts, etc.

Figure 3B:
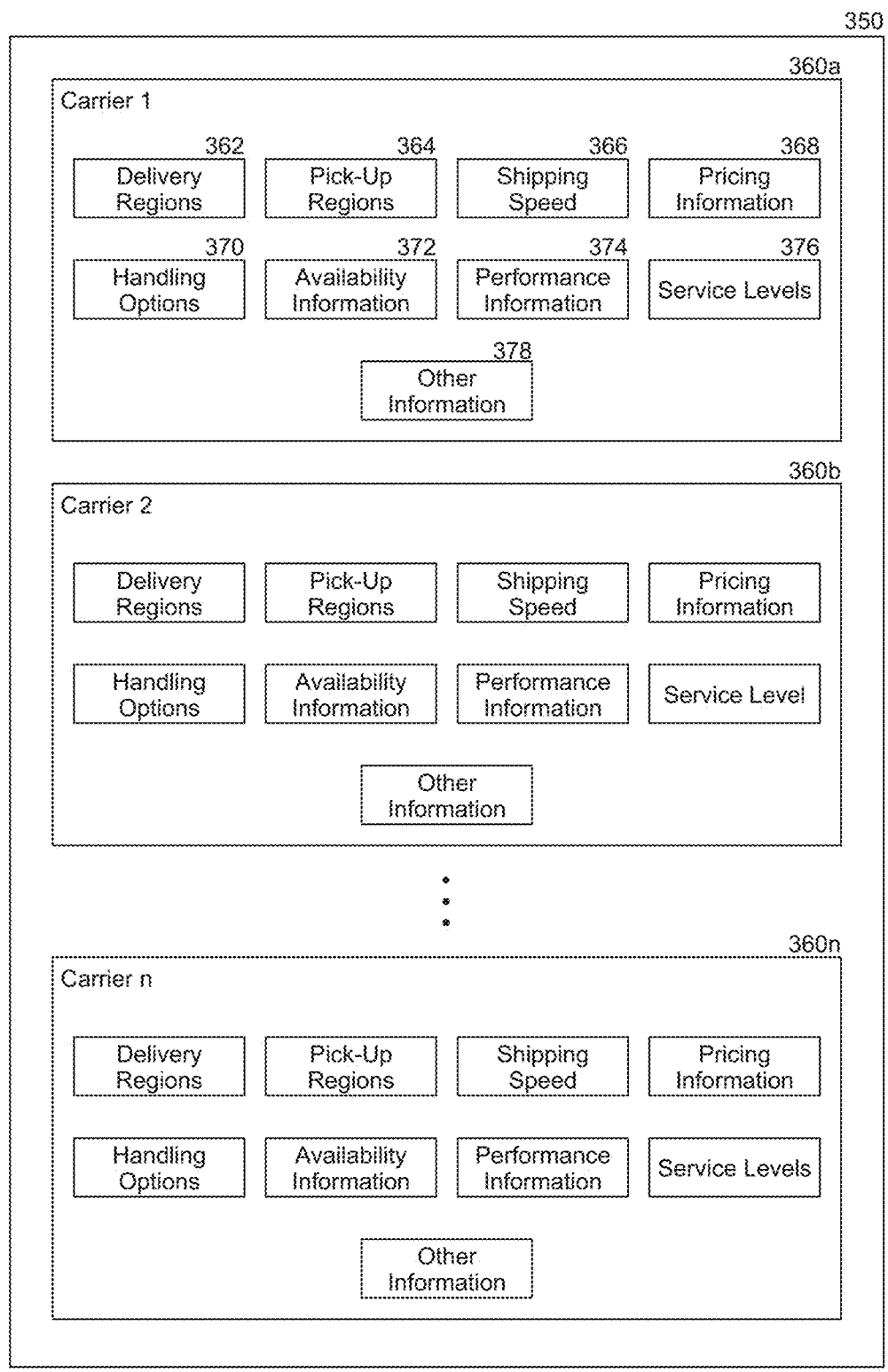
FIG. 3B is a schematic illustration of an exemplary data structure for storing carrier information.

FIG. 3B is a schematic illustration of an exemplary data structure 350 for storing carrier information. The data structure 350 is generated and/or accessed by a warehouse network management system. For example, the data structure 350 can be incorporated in the database 212 described with respect to FIG. 2A. The data structure 350 includes a plurality of carrier data sets 360a-n. Each carrier data set stores information for a corresponding carrier, such as delivery regions 362, pick-up regions 364, shipping speed 366, pricing information 368, handling options 370, availability information 372, performance information 374, service levels 376, and other information 378. The information in the carrier data set can also include any information previously described with respect to carrier information 320 of FIG. 3A. Each carrier data set can store carrier information in a standardized format so the warehouse network management system can easily search and analyze the information, e.g., to perform the inventory placement processes described herein.

Delivery regions 362 can include any information relevant to the locations where the carrier can deliver shipments, such as addresses, area codes, maps, GPS coordinates, other geographic descriptors, and the like. In some embodiments, delivery regions 362 are specified in terms of distance values or ranges, e.g., within a certain number of miles from a specified location. For example, a carrier may only provide same-day shipping within a 30 mile radius of a particular warehouse node location.

Pick-up regions 364 can include any information relevant to the locations where the carrier can pick up shipments for delivery, such as addresses, area codes, maps, GPS coordinates, other geographic descriptors, and the like. In some embodiments, pick-up regions 364 includes a list of the warehouse nodes that are served by the carrier.

Shipping speed 366 can include any information relevant to the time frames in which shipments are to be delivered to customers, such as types of shipping speeds available (e.g., 12-hour delivery, same-day delivery, next-day delivery, two-day delivery, three to five business-day delivery, standard, express, priority), pick-up regions where shipping speed options are available, delivery regions where shipping speed options are available, delivery distances where shipping speed options are available, seasonal information about when shipping speeds are expected to be slower or faster (e.g., holidays), and the like. Shipping speeds can be specified in terms of any suitable unit of time, such as days or hours.

Pricing information 368 can include any information relevant to prices for delivering shipments, such as prices per unit (e.g., per pallet), prices per weight (e.g., per pound), prices based on shipping speed, prices based on delivery region, prices based on pick-up region, prices based on shipping distance, flat-rate shipping prices, prices for special handling (e.g., for refrigeration, fragile goods, large goods), prices for add-ons or other services, available discounts (e.g., for high-volume shippers), and the like.

Availability information 372 can include any information relevant to the availability of the carrier to deliver shipments, such as time frames (e.g., days, weeks, months) when the carrier is available to pick up from a pick-up region, time frames when the carrier is available to deliver to a delivery region, time frames when shipping speed options are available, pick-up windows or time frames when the carrier is available to pick-up shipments from a particular warehouse node or other location, whether the carrier supports pick-up and delivery on weekends, shipment parameters (e.g., maximum dimensions, weight), and the like.

Performance information 374 can include any information relevant to the quality of services provided by the carrier, such as historical data (e.g., amounts, types, dates, timeliness, etc. of previous shipments delivered by the carrier), feedback (e.g., from merchants or other users that have shipped inventory or otherwise interacted with the carrier), quality ratings or scores, incident reports, and the like.

Service levels 376 can include any information relevant to the service level options provided by the carrier, such as how the shipment is transported (e.g., ground, air) and the delivery options for the shipment (e.g., delivery to a threshold of a destination address, delivery to a room of choice within a destination address, white glove delivery including delivery and set-up). In some embodiments, the service levels 376 may be combined with or include information pertaining to the shipping speed 366, for example, when the service level options provided by a carrier are also associated with a corresponding shipping speed (e.g., 2-day air).

Other information 378 can include any other carrier information suitable for use with the embodiments described herein.

It will be appreciated that the data structure 350 illustrated in FIG. 3B can be arranged differently in other embodiments. For example, some of the fields of data structure 350 can be combined with each other. Additionally, some of the fields of data structure 350 can be divided into subfields. Any of the carrier information described with respect to FIG. 3B can be stored in any suitable format, e.g., tables, arrays, matrices, maps, charts, etc.

For example, in some embodiments, the shipping speed 366, pricing information 368, and/or service levels 376 can be stored as a set of data tables representing the transit times and costs for a plurality of origin-destination pairs. Each entry in the data table can include information regarding the name of the carrier, the service level option (e.g., ground), the shipment origin (e.g., an origin area code), and one or more sets of shipment destinations and the associated shipping speed and cost for delivery to those destinations. For example, each entry can include a first set of shipment destinations corresponding to a first shipping speed (e.g., a range of area codes for which same-day delivery from the origin is available), a second set of shipment destinations corresponding to a second shipping speed (e.g., a range of area codes for which 1-day delivery from the origin is available), a third set of shipment destinations corresponding to a third shipping speed (e.g., a range of area codes for which 2-day delivery from the origin is available), and so on.

Figure 4:
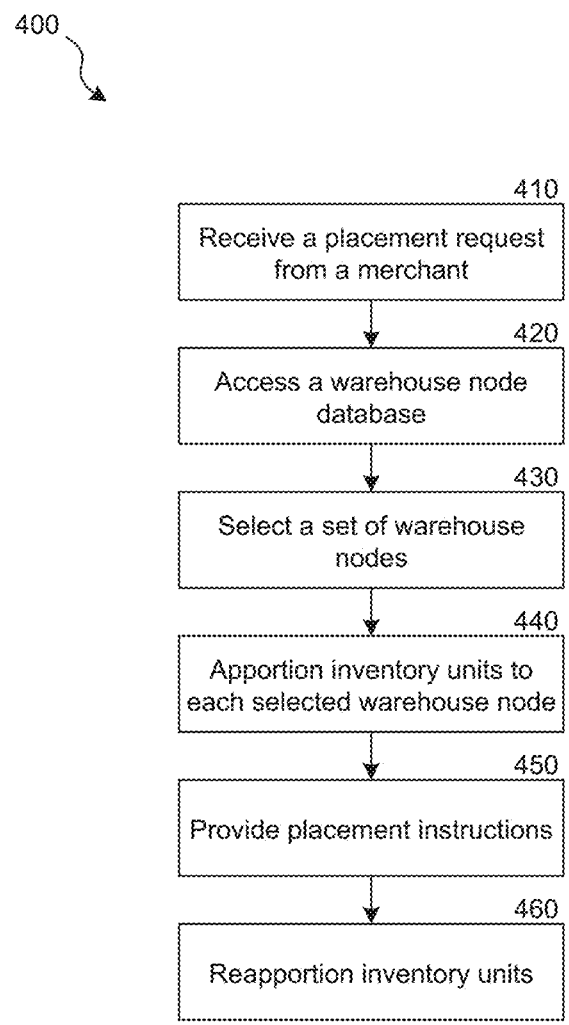
FIG. 4 is a flow diagram illustrating an exemplary process implemented by a warehouse network management system for apportioning inventory units between a plurality of different warehouse nodes.

FIG. 4 is a flow diagram illustrating an exemplary process 400 implemented by a warehouse network management system for apportioning inventory units between a plurality of different warehouse nodes. The process 400 can be performed by one or more computing devices of the system (e.g., servers 202 of FIG. 2A). The process 400 begins at block 410, where the system receives a placement request from a merchant. As described herein, the placement request can be transmitted from a merchant device (e.g., devices 204a-c of FIG. 2A) to a computing device of the system (e.g., servers 202 of FIG. 2A). The placement request is a request to store a set of inventory units intended to be shipped to customers at a later date. The placement request can include one or more inventory parameters specifying characteristics of the inventory to be stored, such as the inventory ID, the type of inventory, a brief description of the inventory, the number of inventory units, the size of each inventory unit, how the inventory is packaged, any special handling requirements (e.g., refrigeration, food products, pharmaceutical products), and the like. In some embodiments, the inventory units are in the merchant's possession or are otherwise not already stored in warehouse nodes operated by the system, such that the placement request involves an inbound transfer of inventory to the system. Alternatively or in combination, some or all of the inventory units can already be located in warehouse nodes operated by the system, such that the placement request involves an internal transfer of inventory between warehouse nodes.

In some embodiments, the placement request includes one or more service level parameters specified by the merchant for shipping the inventory to customers. The service level parameters reflect desired shipping characteristics or performance that the merchant would like to offer customers when inventory units are subsequently shipped from warehouses where the inventory is stored to those customers. As described herein, the service level parameters can include one or more of a delivery region in which customers are to receive shipped products, a desired shipping speed to that delivery region, a shipping cost, an anticipated shipping period, a customer segment, a desired customer experience, a demand coverage level, and/or a performance level. The delivery region includes any location where inventory is expected to be shipped, e.g., the locations of expected customers for the inventory. The delivery region can encompass one or more neighborhoods, area codes, cities, counties, states, countries, etc. The delivery region can include a single contiguous geographic region, or can include multiple geographic regions that may or may not be contiguous with each other. Typically, each delivery region is specified by one or more zip codes, although other methods of geocoding areas may be utilized by the system. For example, Los Angeles county has zip codes ranging from 90001 to 90899. Those zip codes may be partitioned into five sub-regions, each sub-region having a set of specified codes that fall into that region. Delivery regions can also be specified based on distance from a predetermined location (e.g., within a certain number of miles from a particular warehouse node location).

The shipping speed specifies the desired time frame in which the shipment is to be delivered to the customer. For example, the merchant can specify that the shipment is to be delivered to the customer within a few hours, the same day, the next day, two days, a number of business days (e.g., three to five, seven to 14, etc.), and so on. The shipping speed can vary based on the delivery region and/or anticipated shipping period.

The shipping cost specifies the cost to be paid by the customer (e.g., an individual consumer) for a shipment of inventory. For example, the merchant can specify that the customer is to receive free shipping, free shipping if a specified purchase amount is made, flat-rate shipping, shipping costing no more than a predetermined threshold, etc. The shipping cost can also vary based on the delivery region, shipping speed, anticipated shipping period, and/or customer segment.

The anticipated shipping period includes a specified time period during which the merchant expects the inventory will likely be shipped to customers, such as a sales promotion period associated with a time-bound campaign. The shipping period can be one or more days, weeks, months, years, etc. In some embodiments, the shipping period corresponds to a holiday, a seasonal event, or another special sales or promotional event (e.g., Black Friday). The shipping period can include a start date and/or time, and an end date and/or time. Optionally, the shipping period can be of indefinite duration, e.g., having a start date but no provided end date and/or time.

The customer segment includes one or more groups of customers that the merchant may like to receive different levels of shipping service, such as new customers, loyalty program customers, high-volume customers, etc. Customer segments can be defined based on purchase behavior (e.g., first-time buyers), whether the customer is part of a loyalty program, the geographic region where the customer is located, the demographics of the customer, etc. For example, certain customer segments can be eligible for lower shipping costs and/or faster shipping speeds. As another example, different customer segments can receive shipments at different times during the anticipated shipping period (e.g., loyalty program customers can receive deliveries during an early promotional event, while regular customers can only receive deliveries later).

The customer experience includes a desired level or type of customer service to be provided in connection with the shipment, such as white-glove service, inside delivery, room of choice delivery, etc. For example, customers may be eligible for white-glove service on their orders if they are part of a loyalty program, during promotional periods, if the order exceeds a specified cost, etc.

The demand coverage level includes a specified amount of customer demand to be fulfilled. The demand can be expressed in geographic terms (e.g., a certain percentage of the population of a city, state, country, etc.), or can be expressed in terms of anticipated or historical demand levels. For example, the merchant may indicate that the inventory levels should be sufficient to fulfill a specified percentage of the historical demand levels for that inventory over a particular time period. As another example, the merchant may indicate that the inventory should be available for delivery at a particular shipping speed for a certain percentage of a regional or national population. In some embodiments, the merchant also provides demand data (e.g., anticipated or historical demand data) so that the system can determine the corresponding demand level. The demand data can include, for example, a listing of delivery regions (e.g., area codes) and the anticipated or historical amounts of inventory sold and/or shipped to each region (e.g., number of shipments, units per shipment) within a particular time frame (e.g., per month). In embodiments where the system is already tracking inventory levels on behalf of the merchant, the system can calculate the demand levels based on the tracking data.

The performance level includes a specified metric characterizing a desired level of successful orders. That is, the performance level specifies a level of customer orders that can be fulfilled without the customer order being subject to a backorder, stockout, or other delay. For example, the performance level can be a specified probability that a particular order will be successfully fulfilled without backordering. As another example, the performance level can be a specified percentage of orders that should be successfully fulfilled without backordering.

The following table represents example combinations of service level parameters that might be received by the system in conjunction with a product placement request. While depicted in tabular form, it will be appreciated that the service level parameters may be received from a merchant via a user interface, API call, or other data feed.

| Inventory Unit | Delivery Region | Shipping Speed | Shipping Cost | Customer Segment |
| --- | --- | --- | --- | --- |
| Product A | Los Angeles County | Same-day delivery | Free shipping | Tier 1 customers |
| | Los Angeles County | Same-day delivery | $5 flat charge | Tiers 2-4 customers |
| | Other CA counties (other than Los Angeles county) | 2-day delivery | Listed carrier rate | Tier 1-4 customers |

In the depicted example, the merchant has provided service level parameters associated with the delivery of "Product A" to the state of California. The merchant has specified a desire to provide a same-day delivery service to any customers in Los Angeles county, with "Tier 1" customers receiving free shipping for same-day delivery and other customers ("Tiers 2-4") having to pay a $5 flat charge for same-day delivery. In contrast, other customers in California outside of Los Angeles county are only able to receive Product A using a 2-day delivery service, with the cost for that service varying depending on a carrier that will be able to deliver within the specified two days.

In some embodiments, the placement request does not include any node level parameters from the merchant. As described herein, node level parameters can include information about the locations where the inventory is to be stored, such as a geographic region (e.g., neighborhood, area code, city, county, state, etc.), a location of a specific warehouse node, and/or an identity of a specific warehouse node. Node level parameters can also include information about carriers to be used to ship the inventory to the customer. Thus, the system can determine how inventory should be placed at multiple different warehouse nodes without requiring, requesting, or otherwise having the merchant select the location where inventory is to be stored, the particular warehouse node(s) to be used to store the inventory, the location of the warehouse node(s), and/or the carrier(s) to be used to ship the inventory to the customer.

At block 420, the system accesses a warehouse node database that stores a plurality of node data sets representing a plurality of warehouse nodes. The database can be or include data structure 300 of FIG. 3A, and the node data sets can be identical or generally similar to node data sets 310*a-n*. Each node data set is associated with a corresponding warehouse node and can include facility information, availability information, pricing information, performance information, carrier information, inventory information, and/or other information for the warehouse node, as described herein.

In some embodiments, the database also stores a plurality of carrier data sets representing a plurality of carriers. The carrier data sets can be included within the node data sets (e.g., as part of the carrier information) or can be provided as a separate data structure. For example, the database can also include data structure 350 of FIG. 3B, and the carrier data sets can be identical or generally similar to carrier data sets 360*a-n*. Each carrier data set can be associated with a corresponding carrier and can include delivery regions, pick-up regions, shipping speed, pricing information, handling options, availability information, performance information, service levels, and/or other information for the carrier, as described herein.

At block 430, the system selects a set of warehouse nodes in response to the placement request, based on the node data sets. The selection is based at least partially on the content of the placement request (e.g., inventory parameters and/or service level parameters). In some embodiments, the system selects one or more warehouse nodes that are capable of storing the inventory units and can also fulfill some or all of the service level parameters specified by the merchant. Certain service level parameters can be mandatory and must be fulfilled (e.g., delivery region, shipping speed, shipping time frame), while others can be optional and do not have to be fulfilled (e.g., shipping cost, customer segment). The merchant can specify which service level parameters are mandatory and which service level parameters are optional. In other embodiments, the selected warehouse nodes must be capable of meeting all of the specified service level parameters.

The system analyzes the node data sets to determine which warehouse nodes are capable of fulfilling the placement request. The system compares one or more parameters in the placement request (e.g., inventory parameters, service level parameters) to the parameters of each warehouse node as specified in the corresponding node data sets to identify warehouse nodes capable of meeting some or all of the requested parameters (e.g., the warehouse node parameters match some or all of the requested parameters). For example, the system can apply the following methodology. Initially, the system identifies all warehouse nodes that are served by carriers that cover the desired delivery region and which offer shipping services of the specified shipping speed. Next, from the identified warehouse nodes that will satisfy the delivery location and speed requirements, the system filters out warehouse nodes that do not meet certain other mandatory parameters (e.g., no available space within the requested shipping time frame, not suitable for handling the type of shipped product, etc.). The resulting set of warehouses after filtration are therefore available and suitable to store the inventory in question, as well as have access to sufficient carrier service to meet the requested service level parameters when inventory units are shipped to customers. It will be appreciated that the number of parameters associated with each placement request (including the inventory parameters and service parameters) as well as the number of warehouse nodes (which can include hundreds or thousands of available nodes, each with different characteristics) and number of carriers (each with different costs and capabilities) makes it a particularly complex undertaking to analyze the node data set to select warehouse nodes to use. The analysis is further exacerbated by merchant demands which can vary on a daily or weekly basis, and which require prompt response to placement requests in order to maintain a viable commercial relationship with the merchant. Additionally, the complexity of the analysis increases significantly when large volumes of placement requests are received from different types of merchants with distinct service level demands (e.g., small- and medium-sized business (SMB) merchants, direct-to-consumer e-commerce merchants, retailers, etc.).

In some embodiments, the system ranks the filtered warehouse nodes and selects the highest-ranked warehouse node(s) to use as responsive to the inventory placement request. The system may rank the warehouse nodes based on the extent to which they meet the requested service level parameters, such as the ability of the warehouse to meet optional service level parameters. If warehouses are equally situated to meet the mandatory service level parameters, the system may rank the warehouse nodes based on the per unit cost to use each node to store the inventory. The selected warehouse nodes may be warehouse nodes that are already being used by the merchant to store inventory, or may be "new" warehouse nodes that are not currently being used by the merchant. Additional features of the selection process are described in greater detail herein, including the process described in FIG. 5.

At block 440, the system apportions a number of inventory units to each selected warehouse node. The apportionment can be based on various factors, such as the projected customer demand for the inventory units (e.g., per region, per time period, etc.), product launch plans (e.g., regional rollout of products), the amount of space available at each warehouse node, the proximity of each warehouse node to the requested delivery region, expected shipment time from the warehouse node to the requested delivery region, the costs associated with storage at the warehouse node and/or shipping from the warehouse node, performance (e.g., quality ratings), and the like. For example, more inventory units can be apportioned to warehouse nodes that are closer to delivery regions where expected customer demand is higher, and fewer inventory units can be apportioned to warehouse nodes that are closer to delivery regions where expected customer demand is lower. As another example, more inventory units can be apportioned to warehouse nodes associated with lower storage and/or shipment costs, and fewer inventory units can be apportioned to warehouse nodes associated with higher storage and/or shipment costs. As a further example, more inventory units can be apportioned to warehouse nodes with better performance, and fewer inventory units can be apportioned to warehouse nodes with poorer performance. In embodiments where warehouse nodes are organized according to a hub-and-spoke model, more inventory units can be apportioned to central "hub" warehouse nodes so that these nodes are ready for internal transfers to satellite "spoke" warehouse nodes. Optionally, the apportionment can be based at least in part on merchant preference, e.g., whether the merchant prioritizes faster shipments, lower costs, performance, etc.

In some embodiments, the selected warehouse nodes are ranked (e.g., by proximity to the delivery region, shipment time to the delivery region, costs, performance, merchant preferences, etc.), and inventory units are apportioned in order of rank. For example, inventory units can be apportioned first to the highest-ranked warehouse node until the available space in that node is filled up. The remaining inventory units are then apportioned to the next warehouse node in the ranking until the available space in that node is filled up, and so on until all inventory units have been apportioned. Alternatively or in combination, inventory units can be apportioned to reduce or minimize the number of shipments to warehouse nodes in order to reduce shipment costs. That is, the system may attempt to minimize the overall cost by repeatedly calculating the overall shipment cost for each apportionment plan using the following function, until the lowest overall costs is determined:

$$\text{overall cost} = \sum_{n=1}^{x} \sum_{m=1}^{y} UT * SC \text{ from source node}(x) \text{ to destination node}(y)$$

where x=number of source nodes currently holding inventory units; y=number of destination nodes that are to be shipped to from the source node in accordance with the apportionment plan; UT=#units transferred to a destination node; and SC=unit shipping cost.

At block 450, the system provides placement instructions for effectuating the determined apportionment of inventory units. In embodiments involving an inbound transfer of inventory, the placement instructions are sent to the merchant so that the merchant can deliver the inventory to the appropriate warehouse nodes. The placement instructions include the selected warehouse nodes (e.g., addresses, names) and the number of inventory units to ship to each node. The placement instructions can also include a time frame when the inventory units should be shipped to the node and/or received at the node, a carrier to be used to ship the inventory units, particular shipping and/or handling options for the inventory units, instructions for packaging and/or labeling the inventory units, and the like. Optionally, the placement instructions can include automatically generated shipping labels for the inventory units.

Subsequently, the merchant can ship or otherwise deliver the inventory units to the warehouse nodes according to the placement instructions. The system can monitor and confirm when the inventory has been received, e.g., via tracking information or other information received from the merchant, warehouse nodes, and/or carriers. In some embodiments, the system can detect if the merchant has made an incorrect shipment (e.g., wrong number of inventory units shipped and/or inventory units shipped to the wrong warehouse node). If an incorrect shipment has been made, the system can provide revised placement instructions for correcting the error (e.g., a number of inventory units to be shipped from one warehouse node to another warehouse node, a number of inventory units to be shipped back to the merchant). The revised placement instructions can be provided to the merchant and/or to the warehouse node(s) where the erroneous shipment was received. In some embodiments, the merchant is responsible for reshipping the inventory according to the revised placement instructions, while in other embodiments the system handles the reshipping but bills the merchant for any associated costs.

In some embodiments, rather than having the merchant ship directly to the selected warehouse nodes, the placement instructions can instead instruct the merchant to ship to one or more warehouse nodes designated for receiving inbound transfers, after which received inventory may be internally transferred to the selected warehouse nodes. In other embodiments, placement instructions for an inbound transfer are not sent to the merchant, but rather to a carrier that picks up the inventory from another entity (e.g., a manufacturer that is producing the inventory, a customs broker that is receiving the inventory at a port, etc.). Thus, the merchant can simply inform the system where and when the inventory can be picked up, and the system coordinates shipping and placement of the inventory at the selected warehouse nodes. Alternatively or in combination, the system can store and/or automatically generate information regarding pick-up locations (e.g., based on previously-received merchant data, previous shipment data, etc.), and can automatically arrange transportation of the inventory from the pick-up location to the selected warehouse nodes without requiring any input from the merchant. In such embodiments, the merchant may not have any knowledge of the locations of the selected warehouse nodes and/or the number of inventory units apportioned to each warehouse node. This approach may be beneficial for simplifying the inbound transfer process for the merchant.

In embodiments involving an internal transfer of inventory between warehouse nodes, the placement instructions can be sent to the operators or managers of the warehouse nodes and/or one or more carriers that are responsible for shipping the inventory between nodes. For example, the origin warehouse node can receive instructions on the number and identity of inventory units to be shipped, instructions for packaging and/or labeling the inventory units, the location of the destination warehouse nodes, the carrier to be used for the shipment, and/or the inventory pick-up time frame. The destination warehouse node can receive instructions on the number and identity of inventory units to be received, instructions for storing and/or handling the inventory units, and the inventory delivery timeframe. The carrier can receive instructions including the locations of the origin warehouse node and destination warehouse node, shipping and/or handling instructions, the timeframes for pick-up and drop-off, and/or the shipping speed with which the inventory should be delivered. In some embodiments, the merchant may not receive any placement instructions, such that the internal transfer is performed independently of the merchant and, optionally, without the merchant knowing that the internal transfer has occurred.

In some embodiments, once the inventory units have been received at the warehouse nodes, the system manages shipments from each warehouse node to consumers and tracks resulting inventory levels as inventory is shipped from each node (e.g., based on inventory information received from the warehouse nodes). The system can generate a report that is provided to the merchant with information regarding the number of inventory units currently at each warehouse node, number of inventory units that have been shipped from each warehouse node, or any other information useful to the merchant in monitoring and managing inventory. Optionally, the system can provide alerts to the merchant if the inventory levels fall below a predetermined threshold or are otherwise determined to be too low.

At block 460, the system optionally reapportions at least some of the inventory units after they have been received at the warehouse nodes. Reapportionment can be performed, for example, to balance inventory levels across warehouse nodes if the inventory levels at a particular warehouse node are too high or too low (e.g., relative to thresholds set by the merchant and/or determined by the system), to restock or reorder inventory at a particular warehouse node, if customer demand at a particular delivery region is higher or lower than expected, if there are changes in the merchant's product launch plans, if shipping times from a particular warehouse node are longer than expected, based on the performance of a warehouse node or carrier, and so on. The reapportionment process can be generally similar to the initial apportionment process described herein with respect to blocks 420-440. Once the warehouse nodes and inventory units for the reapportionment have been determined, the system can implement the reapportionment (e.g., by sending shipping instructions to the appropriate warehouse nodes). The system can optionally bill the merchant for any costs associated with reapportionment.

The system can automatically determine when reapportionment is necessary or beneficial, and perform the reapportionment independently of the merchant (e.g., without instructions from the merchant). In some embodiments, the system reapportions inventory without requiring, requesting, or otherwise having the merchant determine how to reapportion the inventory. Instead, reapportionment is automatically triggered when inventory levels fall below certain inventory thresholds associated with each warehouse node. In other embodiments, the system receives instructions or another indication from the merchant that reapportionment should be performed (e.g., information regarding changes in customer demand, product launch plans, etc.), but the merchant does not specify how the reapportionment should be performed (e.g., locations of warehouse nodes, number of inventory units to reapportion, etc.). For example, a merchant can initiate reapportionment by informing the system that they would like to change the service levels offered (e.g., increase shipping speeds, increase performance levels, etc.), or implement an upcoming promotional sales event. In further embodiments, the system receives a reapportionment request from the merchant including instructions on how to reapportion inventory.

In some embodiments, reapportionment is performed without notifying the merchant that reapportionment has occurred. In other embodiments, the system can notify the merchant that reapportionment has occurred, but may not notify the merchant of the locations of the warehouse nodes where inventory has been reapportioned to. In further embodiments, the system notifies the merchant that reapportionment has occurred, including the locations of the warehouse nodes and the number of inventory un its reapportioned.

The process 400 can be implemented in a number of different ways. For example, some of the steps can be omitted (e.g., block 460). Some of the steps can be combined with each other or with steps of other processes described herein. In some embodiments, the process 400 is repeated by the warehouse network management system to process multiple placement requests received from multiple different merchants and/or from the same merchant. Some or all of the steps of the process 400 can be performed automatically by the system (e.g., by servers 202 of FIG. 2A) without input from a human operator. The initial selection and apportionment of warehouse nodes to receive inventory, as well as the subsequent re-apportionment of inventory, is difficult to perform manually because of the large numbers of warehouse nodes involved (e.g., hundreds or thousands of warehouse nodes), the multifactorial analysis to determine suitability of nodes for storing inventory in accordance with the requested parameters, and the complexity of optimizing and coordinating the distribution of large numbers of inventory units associated with different merchants and different placement requirements.

Figure 5:
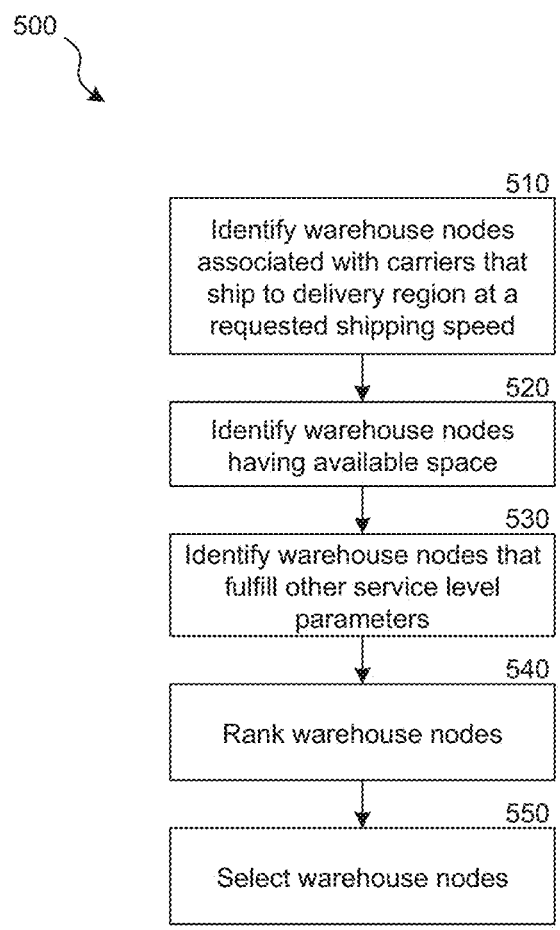
FIG. 5 is a flow diagram illustrating an exemplary process implemented by a warehouse network management system for selecting a set of warehouse nodes in response to a placement request.

FIG. 5 is a flow diagram illustrating an exemplary process 500 implemented by a warehouse network management system for selecting a set of warehouse nodes in response to a placement request. The process 500 can be performed as part of a process for apportioning inventory between warehouse nodes (e.g., as part of block 430 of FIG. 4). The process 500 can be performed by one or more computing devices of the system (e.g., servers 202 of FIG. 2A).

The process 500 begins at block 510, the system identifies one or more warehouse nodes associated with at least one carrier that ships to the requested delivery region at the requested shipping speed. As described herein, the delivery region and shipping speed can be included in the service level parameters provided in the merchant's placement request. The system can analyze the node data sets (e.g.; the node data sets associated with the subset of warehouse nodes identified at block 510) to determine which carriers ship from each warehouse node, based on the carrier information stored in the node data sets and/or one or more carrier data sets (e.g., carrier data sets 360a-n of FIG. 3B). The system can then determine the delivery regions served by the carrier as well as the availability of the carrier for shipping. The system can also determine whether the carrier is capable of providing the requested handling procedures for the inventory units (e.g., based on the handling options provided by the carrier). Based on this analysis, the system identifies one or more warehouse nodes associated with suitable carriers and/or filters out warehouse nodes that are not associated with suitable carriers.

At block 520, from the warehouse nodes that are suitable to ship to the requested delivery region at the requested shipping speed, the system identifies one or more warehouse nodes having available space to store the requested inventory units. Based on the information included in the placement request, the system can determine the amount of space needed to store the inventory units, the time frame during which storage is requested, special handling procedures for the inventory units (e.g., refrigeration), and/or any other parameters relevant to how the inventory is to be stored. The system can access a database containing a plurality of node data sets corresponding to a plurality of warehouse nodes (e.g., node data sets 310a-n of FIG. 3A) and can analyze each node data set to determine whether the corresponding warehouse node has any available space for storing at least some of the inventory units during the requested time frame (e.g., based on the availability information for the warehouse node). The system can also determine whether the warehouse node is capable of fulfilling the requested handling procedures and/or any other parameters for storing the inventory units (e.g., based on the facility information for the warehouse node). Based on this analysis, the system identifies one or more available warehouse nodes and/or filters out unavailable warehouse nodes.

At block 530, from the filtered list of available warehouse nodes, the system optionally identifies one or more warehouse nodes that fulfill other service level parameters in the placement request. As described herein, the other service level parameters can include shipping cost and/or customer segment. The system can analyze the node data sets (e.g., the node data sets associated with the subset of warehouse nodes identified at block 510 or block 520) and/or the carrier data sets (e.g., associated with the carriers that serve the identified warehouse nodes) to determine which warehouse nodes are capable of fulfilling the other service level parameters. For example, the system can determine whether the warehouse node is served by a carrier capable of shipping the inventory units from the warehouse node to the requested delivery region at a cost either at or better than the requested shipping cost (e.g., based on the pricing information for the carrier). Based on this analysis, the system identifies one or more warehouse nodes capable of fulfilling the parameters and/or filters out warehouse nodes that are not capable.

At block 540, the system optionally ranks the identified warehouse nodes. The ranking can be based on various factors, such as the number of parameters met by the warehouse node, the extent to which each warehouse node fulfills the parameters, merchant preferences, and/or other parameters (e.g., distance from the delivery region, shipping time to the delivery region, storage costs charged by the warehouse node, shipping costs charged by the associated carrier, warehouse node performance, carrier performance, etc.). The system can use a number of different techniques to rank the warehouse nodes. For example, the system can generate a score for each warehouse node that represents the degree to which the warehouse node meets specified parameters, and then rank the warehouse nodes by the generated score. As another example, the system can sort the warehouse nodes according to a suitable algorithm (e.g., first by lowest cost, then by best performance, etc.), and then use the sorting order as the ranking for the warehouse nodes. The system can prioritize certain parameters during the ranking process, e.g., by giving those parameters more weight, considering those parameters before other parameters, etc.

The prioritization can be based on merchant preference (e.g., whether the merchant wants fastest shipping, lowest cost, best performance, etc.) or predetermined by the system. For example, the system may prioritize the following factors, in order: (1) sufficient delivery speed to cover the desired service level, (2) lower outbound shipment costs, (3) lower inbound shipment costs, (4) lower fulfillment cost per unit (CPU), and (5) warehouse node quality. A simplified table reflecting how such scoring could be applied with three factors is depicted below, with each factor scored from 1-5, a weight multiplied by each factor, and the contribution of each weighted factor summed to arrive at a total score:

|        | Factor 1 (1-5) | Factor 1 weight | Factor 2 (1-5) | Factor 2 weight | Factor 3 (1-5) | Factor 3 weight | Total Score |
|--------|----------------|-----------------|----------------|-----------------|----------------|-----------------|-------------|
| Node A | 5              | 3               | 3              | 2               | 2              | 1               | 23          |
| Node B | 4              | 3               | 4              | 2               | 5              | 1               | 25          |
| Node C | 3              | 3               | 2              | 2               | 1              | 1               | 14          |
| Node D | 1              | 3               | 4              | 2               | 3              | 1               | 11          |

In the depicted example, even though Node A has the best rating for factor 1, use of Node B is prioritized by the system above Node A because the weighted scoring of all factors indicates that Node B is a better overall fit for the intended use.

At block 550, the system selects a subset of the identified warehouse nodes for storing the inventory units. The system can determine the total amount of space needed to store the inventory units and then select one or more warehouse nodes that collectively have sufficient available space to store the inventory units. The selection can be performed in many different ways. For example, in embodiments where the warehouse nodes have been ranked (e.g., at block 540), the system can select warehouse nodes in order of rank until the space requirements for the inventory have been met. As another example, the system can preferentially select warehouse nodes that have more available space, e.g., so that the inventory units are spread across as few warehouse nodes as possible.

The process 500 can be implemented in a number of different ways. For example, the order of the steps can be varied as desired (e.g., block 520 can be performed before block 510). In some embodiments, some of the steps are omitted (e.g. block 530 and/or block 540). Some of the steps can be combined with each other or with steps of other processes described herein (e.g., process 400 of FIG. 4). In some embodiments, some or all of the steps of the process 500 are performed automatically by the system (e.g., by servers 202 of FIG. 2A) without input from a human operator.

Figure 6:
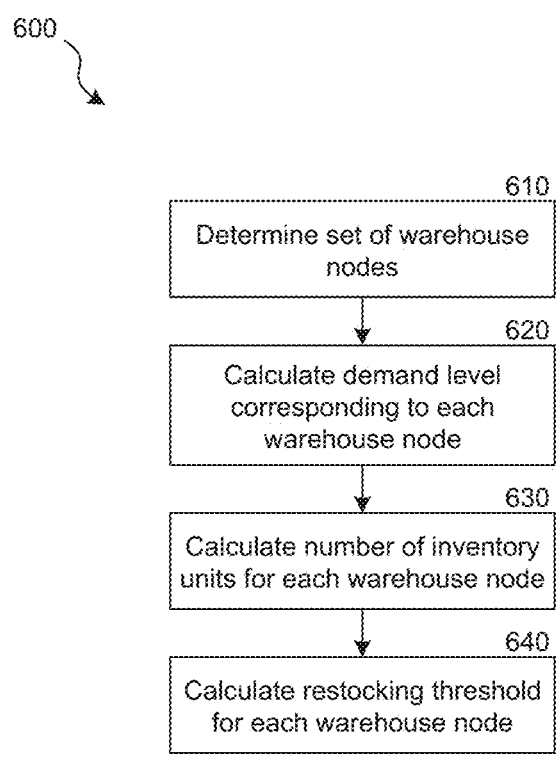
FIG. 6 is a flow diagram illustrating an exemplary process implemented by a warehouse network management system for calculating the number of inventory units to be apportioned to a warehouse node.

FIG. 6 is a flow diagram illustrating an exemplary process 600 implemented by a warehouse network management system for calculating the number of inventory units to be apportioned to a warehouse node based on anticipated demand. The process 600 can be performed as part of a process for apportioning inventory between warehouse nodes (e.g., as part of block 440 of FIG. 4). The process 600 can be performed by one or more computing devices of the system (e.g., servers 202 of FIG. 2A).

The process 600 begins at block 610, where the system determines a set of warehouse nodes for placement of inventory based at least in part on anticipated or historical demand levels for the inventory. The system can receive demand data indicating the anticipated or historical levels of demand for the inventory per geographic region (e.g., per zip code), and can calculate the number and locations of warehouse nodes sufficient to satisfy the demand. In some embodiments, this process involves selecting warehouse nodes from the merchant's existing network of warehouse nodes (i.e., warehouse nodes that are already being used by the merchant for inventory storage). If the merchant's network is not sufficient to satisfy the demand, or if the merchant does not already have a network, the system can add warehouse node locations based on demand levels. For example, the system can add more warehouse nodes located at regions associated with higher demand, and add fewer warehouse nodes located at regions associated with lower demand. In other embodiments, the population level can be used as a proxy for demand level. Areas of higher population will require correspondingly higher levels of inventory than areas of lower population.

At block 620, the system calculates a demand level corresponding to each warehouse node. In some embodiments, each warehouse node is associated with a particular geographic region (e.g., a region to which shipments can be delivered from the warehouse node with a desired shipping speed). The demand level at that region can then be calculated (e.g., based on anticipated or historical demand data, or population data). In embodiments where multiple warehouse nodes are located within the same geographic region, the total demand levels for that region can be divided between the warehouse nodes so that each node is responsible for fulfilling a specified percentage of the total.

At block 630, the system calculates the number of inventory units to be apportioned to each warehouse node to meet the corresponding demand level. In some embodiments, the quantity Q of inventory units to be placed at the warehouse node can be calculated based on one or more of the following factors: the demand level D for that node (e.g., per unit of inventory), the cost per unit C of the inventory paid by the merchant, the cost of placing an order S for the inventory (e.g., batch, set-up, order, and/or inbound transportation costs), the holding cost H of storing the inventory at the node (e.g., expressed as a percentage of the cost of the inventory, which may be based on opportunity costs and/or storage costs), and the total cost TC to the merchant. In situations where the merchant requests a single inbound transfer of inventory to the warehouse nodes, the quantity Q of inventory for each warehouse node can be calculated using the following equation:

$$Q = \sqrt{\frac{2 \times D \times S}{H}}$$

Additionally, the total cost TC to the merchant for placing the inventory at each warehouse node can be calculated as follows:

$$TC = (D \times C) + \left(\frac{D}{Q} \times S\right) + \left(\frac{Q}{2} \times H\right)$$

At block 640, the system optionally calculates a restocking threshold for each warehouse node. The restocking threshold can indicate the inventory level below which the inventory at the warehouse node should be replenished to avoid backorder, stockout, etc. This step can be performed in situations where the merchant has requested multiple inbound transfers of inventory or otherwise wishes to maintain certain inventory levels (e.g., for year-round or long-term sales). The restocking threshold R (e.g., expressed in number of inventory units) can be calculated based on one or more of the following factors: the lead time L for shipping the inventory to the warehouse node (e.g., time from placing an order with a manufacturer, time to complete an inbound transfer from the merchant, time to complete an internal transfer from another warehouse node), the average daily demand D', the specified performance level (e.g., expressed as the number of standard deviations Z corresponding to the specified probability of no stockout during the lead time L), and the amount of usage during the lead time L (e.g., expressed as the standard deviation of the usage a). The restocking threshold R can be calculated as follows:

$$R = D' \times L + Z \times \sigma$$

The process 600 can be implemented in a number of different ways. For example, the order of the steps can be varied as desired. In some embodiments, some of the steps are omitted. For example, block 640 can be omitted in situations where the merchant has requested a single inbound transfer or otherwise does not wish to maintain inventory levels (e.g., a limited-time promotional event). Some of the steps can be combined with each other or with steps of other processes described herein (e.g., process 400 of FIG. 4, process 500 of FIG. 5). In some embodiments, some or all of the steps of the process 600 are performed automatically by the system (e.g., by servers 202 of FIG. 2A) without input from a human operator.

In some embodiments, some or all of the processes described herein (e.g., processes 400-600) are performed to place inventory at one or more warehouse nodes in preparation for a time-bound campaign, such as a sales event. For example, a merchant may wish to implement a special promotion in which inventory is sold to customers in accordance with certain service level parameters (e.g., free 2-day shipping across the entire country for a specified time period, with a 95% probability of that no backordering will occur). The merchant can send a placement request to the system including information regarding the time-bound campaign, such as the time period for the time-bound campaign (e.g., start date, end date) and the service level parameters to be satisfied during the time-bound campaign. The system can determine how the inventory should be apportioned across the warehouse nodes to meet the service level parameters for the requested time period, in accordance with the processes described herein. For example, the system can apportion inventory from central (e.g., hub) warehouse nodes to distributed (e.g., spoke) warehouse nodes at locations where high demand levels are anticipated. The apportionment can involve transfers (e.g., inbound and/or internal transfers) to warehouse nodes that are already being used to store the merchant's inventory, as well as transfers to "new" nodes that were not previously being used by the merchant but are now being added to fulfill the service level parameters. The process of placing inventory at existing and/or new warehouse nodes in preparation for a sales event may be referred to as a "pop up operation." The time-bound campaign can commence once the pop up operation is completed. During the time-bound campaign, inventory at warehouse nodes may be reapportioned and/or restocked through additional inbound and/or internal transfers.

A "pop down operation" can be performed after completion of the time-bound campaign. The pop down operation can involve reducing the number of warehouse nodes used to store the inventory, such as by consolidating inventory from distributed (e.g., spoke) warehouse nodes to central (e.g., hub) warehouse nodes, removing inventory from warehouse nodes that were added to the merchant's network specifically for the time-bound campaign, etc. In some embodiments, the system can determine which warehouse nodes should be maintained based on service level parameters or other data indicating the merchant's ordinary sales practices. Optionally, the system can automatically determine how inventory should be reapportioned to accomplish the pop down operation, without requiring an additional placement request or other input from the merchant.

Figure 7:
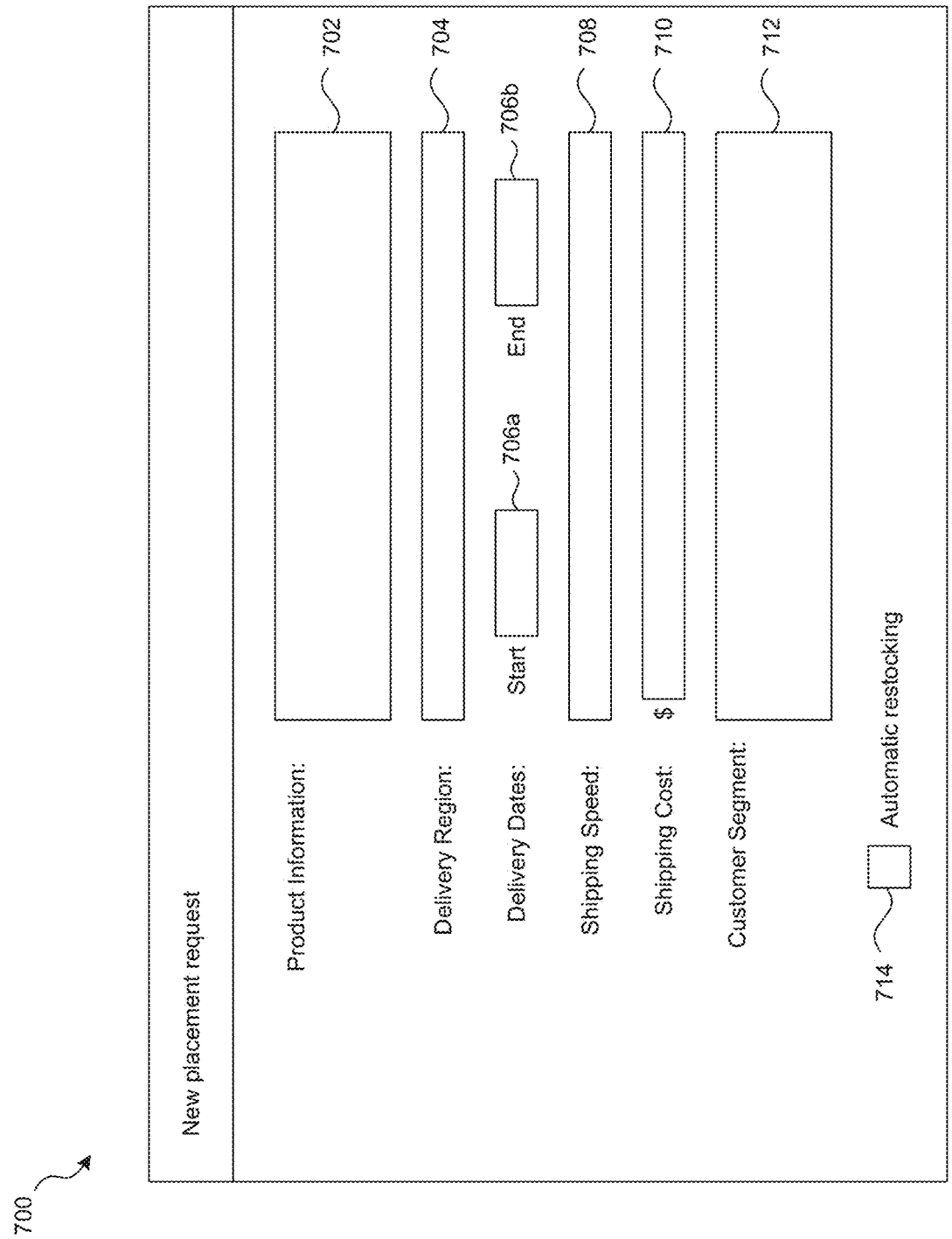
FIG. 7 is a schematic illustration of an exemplary user interface for receiving a placement request from a merchant.

FIG. 7 is a schematic illustration of an exemplary user interface ("UI") 700 for receiving a placement request from a merchant. The UI 700 can be displayed on a computing device operated by or otherwise associated with the merchant (e.g., merchant devices 204*a-c* of FIG. 2A). The UI 700 includes a product information field 702, a delivery region field 704, a delivery start date field 706*a*, a delivery end date field 706*b*, a shipping speed field 708, a shipping cost field 710, a customer segment field 712, and an automatic restocking field 714. Any of the fields of the UI 700 can include one or more text boxes, dialog boxes, dropdown menus, check boxes, radio buttons, toggles, date and time pickers, or any other suitable user input element.

The product information field 702 is used by the merchant to input information regarding the inventory to be stored. For example, the merchant can enter the number of inventory units, an inventory or product ID, the type of inventory, a brief description of the inventory, the size of the inventory, how the inventory is packaged, any special handling instructions, etc. In some embodiments, the merchant can input multiple different types of inventory items as part of a single placement request.

The delivery region field 704 is used to input information regarding the geographic regions where the merchant expects the inventory to be shipped. Delivery region information can be input in various ways, such as by text entry (e.g., entry of one or more zip codes, cities, states, etc.), selection from a list (e.g., selecting one or more zip codes or states), selection from a map (e.g., selection of regions on a displayed map), and the like. In some embodiments, the merchant can specify a different delivery region for each inventory item entered in the product information field 702.

The delivery start date field 706*a* and end date field 706*b* are used to input the start and end dates, respectively, of the shipping period during which the merchant expects the inventory to be shipped. The dates can be entered manually, by selection from a date and time picker, or any other suitable method. Optionally, the merchant can leave the end date field 706*b* blank to indicate an indefinite shipping time frame. In some embodiments, the merchant can specify a different delivery start and end date for each inventory item entered in the product information field 702.

The shipping speed field 708 is used to input the desired fastest available shipping speed for shipping the inventory to the customer. For example, if the merchant selects same-day delivery speed, it means that the inventory should be available for same-day delivery to the corresponding delivery region. The inventory can, of course, be shipped at a slower speed within that region as well, should cost or customer preference dictate something different. The merchant can choose from a pre-populated list of shipping speed options or can enter the shipping speed manually. In some embodiments, the merchant can specify a different shipping speed for different inventory items, delivery regions, shipping time frames, etc. If the shipping speed field is not populated by the merchant, the ordering customer can select the shipping speed at the time ordering.

The shipping cost field 710 is used to input the desired shipping cost to be paid by the customer for shipment of the inventory. The merchant can choose from a pre-populated list of cost options or can enter the cost manually. Optionally, the merchant can enter a cost range (e.g., a maximum and/or minimum shipping cost). If the shipping cost field is not populated by the merchant, carrier charges associated with shipping are simply passed on directly to the ordering customer. In some embodiments, the merchant can input a different shipping cost for different inventory items, delivery regions, shipping time frames, shipping costs, etc.

The customer segment field 712 can be used to input one or more customer segments that are to receive special benefits or treatment due to the segment that the customer falls within. The merchant can choose from a pre-populated list of options or can enter the customer segment information manually. Optionally, the merchant can enter multiple different customer segments and specify the particular services for each customer segment (e.g., shipping cost, shipping speed, shipping time frame, etc.). In some embodiments, the customer segment field 712 is optional and can be left blank or omitted altogether.

The automatic restocking field 714 can be used to indicate whether the merchant wishes for inventory levels at the warehouse nodes to be replenished when low (e.g., when the inventory levels are below a restocking threshold or at risk of running out). If automatic restocking is selected, the merchant may be prompted to specify the source for replenishing the inventory (e.g., direct order from a manufacturer, inbound transfer from the merchant, internal transfer from another warehouse node, etc.).

The information entered in the UI 700 is used to generate a placement request that is transmitted to the warehouse network management system. The system can then determine how to apportion inventory between warehouse nodes to fulfill the request as previously described herein.

It will be appreciated that the UI 700 may be configured in many different ways. For example, one or more of the fields shown in FIG. 7 may be combined with each other. Optionally, some or all of the fields shown in FIG. 7 may be omitted. Alternatively or in combination, the UI 700 may include additional fields for inputting other types of information. For example, the UI 700 can include one or more fields for inputting other types of service level parameters, such as demand coverage level and/or performance level. As another example, the UI 700 can also include one or more fields for inputting a maximum cost per unit (CPU) or range of CPU values that the merchant wishes to pay for inventory placement, order fulfillment, and/or any other inventory transactions. The CPU can encompass, for example, inbound transfer costs, storage costs, pick and pack costs, and/or shipping costs. In yet another example, the UI 700 can include one or more fields for inputting one or more channels through which the inventory is to be distributed to customers (e.g., retail, e-commerce, hybrid, etc.).

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

Although certain embodiments herein are described in the context of "warehouse nodes," it will be appreciated that the system and methods herein are applicable to many different kinds of facilities for storing inventory and are not limited to commercial warehouses. Additionally, a "carrier" as described herein includes any provider of services for transportation of inventory by ground, air, water, or combinations thereof. As described herein, a "merchant" can be a vendor, retailer, reseller, or any other individual or entity providing inventory for sale. A "customer" as described herein includes consumers or other individuals or entities that purchase inventory from a merchant, as well as retail stores or other entities that sell inventory to consumers on behalf of a merchant.

These and other changes can be made to the disclosed technology in light of the above Detailed Description. While the above description describes certain examples of the disclosed technology, and describes the best mode contemplated, no matter how detailed the above appears in text, the disclosed technology can be practiced in many ways. Details of the system and method may vary considerably in their specific implementations, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. In general, the terms used in the following claims should not be construed to limit the disclosed technology to the specific examples disclosed in the specification, unless the above Detailed Description section explicitly defines such terms.

We claim:

1. A computer-implemented method for apportioning inventory units to a plurality of warehouse nodes to meet desired service levels, the method comprising:
    receiving, at a server and from a merchant computing device, a placement request for a set of inventory units from a merchant, the placement request including a plurality of service level parameters including a delivery region and a shipping speed, wherein the placement request does not include any warehouse node locations;

receiving, from one or more warehouse nodes, warehouse node information, wherein the one or more warehouse nodes provide the warehouse node information in a non-standardized format;

converting, by the server, the non-standardized warehouse node information into a plurality of node data sets of a standardized format;

storing, at a database, the plurality of node data sets of the standardized format;

accessing, by the server, the database storing the plurality of node data sets, each node data set being associated with a warehouse node, wherein each node data set includes availability information and carrier information for the warehouse node;

selecting, by the server and based on the node data sets and the service level parameters, a set of warehouse nodes for storing the inventory units, wherein the selecting includes:
   identifying, by the server and based on the availability information, one or more warehouse nodes having available space to store at least some of the inventory units, and
   identifying, by the server and based on the carrier information, one or more warehouse nodes associated with at least one carrier that ships from the warehouse node to the delivery region at the received shipping speed;

apportioning, by the server, a number of inventory units to each selected warehouse node;

providing, by the server and to one or more node devices via a communication network, placement instructions including the selected warehouse nodes and the number of inventory units to ship to each selected warehouse node;

identifying, by the server, an inventory threshold for at least one warehouse node of the selected warehouse nodes;

determining, by the server, whether an inventory level for the at least one warehouse node has fallen below the identified inventory threshold for that warehouse node; and in response to determining that the inventory level for the at least one warehouse node of the selected warehouse nodes has fallen below the identified inventory threshold for that warehouse node, automatically triggering reapportionment of at least some of the inventory units by the server,
   wherein reapportionment of the at least some of the inventory units includes providing other placement instructions from the server to the one or more node devices via the communication network for the at least some of the inventory units, and
   wherein the other placement instructions are different from the provided placement instructions.

2. The method of claim 1, wherein the service level parameters include an anticipated shipping period, and wherein selecting the set of warehouse nodes comprises identifying, based on the availability information, one or more warehouse nodes having availability during the anticipated shipping period.

3. The method of claim 1, wherein the service level parameters include a shipping cost, and wherein selecting the set of warehouse nodes comprises identifying, based on the carrier information, one or more warehouse nodes associated with at least one carrier that ships from the warehouse node to the delivery region at the received shipping speed for the shipping cost.

4. The method of claim 1, wherein the service level parameters include a customer segment.

5. The method of claim 1, wherein the placement request further includes at least one channel for distributing the inventory units to customers.

6. The method of claim 1, wherein the number of inventory units is apportioned based on a projected demand for the inventory units.

7. The method of claim 1, wherein selecting the set of warehouse nodes further comprises ranking identified warehouse nodes.

8. The method of claim 7, wherein the identified warehouse nodes are ranked based on one or more of storage costs, shipping costs, warehouse node performance, or carrier performance.

9. The method of claim 1 wherein selecting the set of warehouse nodes comprises selecting at least one warehouse node that is not currently being used by the merchant to store inventory.

10. The method of claim 1 wherein selecting the set of warehouse nodes comprises selecting at least one warehouse node that is currently being used by the merchant to store inventory.

11. The method of claim 1 wherein the placement instructions are provided to the merchant.

12. The method of claim 1 wherein the placement instructions are provided to a warehouse manager.

13. The method of claim 1, further comprising receiving a plurality of different placement requests from a plurality of different merchants, wherein none of the placement requests include warehouse node locations.

14. The method of claim 1, further comprising tracking levels of inventory units at the selected warehouse nodes.

15. The method of claim 14, further comprising reapportioning at least some inventory units between warehouse nodes based on the tracked levels of inventory units.

16. The method of claim 15, wherein the reapportioning is performed without notifying the merchant.

17. A computer-implemented method for apportioning inventory units to a plurality of warehouse nodes to meet desired service levels, the method comprising:

receiving, at a server and from a computing device, a placement request for a set of inventory units from a merchant, the placement request including a plurality of service level parameters including a delivery region and a shipping speed;

receiving, from one or more warehouse nodes, warehouse node information, wherein the one or more warehouse nodes provide the warehouse node information in a non-standardized format;

converting, by the server, the non-standardized warehouse node information into a plurality of node data sets of a standardized format;

storing, at a database, the plurality of node data sets of the standardized format;

accessing, by the server, the database storing the plurality of node data sets, each node data set being associated with a warehouse node, wherein each node data set includes availability information and carrier information for the warehouse node;

selecting, by the server and based on the node data sets and the service level parameters, a set of warehouse nodes for storing the inventory units, wherein the selecting includes:

identifying, based on the availability information, one or more warehouse nodes having available space to store at least some of the inventory units, and identifying, based on the carrier information, one or more warehouse nodes associated with at least one carrier that ships from the warehouse node to the delivery region at the received shipping speed;

apportioning, by the server, a number of inventory units to each selected warehouse node;

providing, by the server and to at least one node device via a communication network, placement instructions including the selected warehouse nodes and the number of inventory units to ship to each selected warehouse node;

determining, by the server, an inventory threshold for at least one warehouse node of the selected warehouse nodes;

determining, by the server, whether an inventory level for the at least one warehouse node has fallen below the determined inventory threshold for that warehouse node; and automatically reapportioning, by the server, at least some inventory units between the selected warehouse nodes without instructions from the merchant and in response to determining that the inventory level for the at least one warehouse node of the selected warehouse nodes has fallen below the identified inventory threshold for that warehouse node, wherein other placement instructions are provided by the server and to the at least one node device via the communication network, the other placement instructions being different from the provided placement instructions.

18. The method of claim 17, wherein the reapportioning is based on projected demand for the inventory units.

19. The method of claim 17, further comprising tracking levels of inventory units at the selected warehouse nodes, wherein the reapportioning is based on the tracked levels.

20. The method of claim 17, wherein the reapportioning is based on performance of a selected warehouse node or a carrier associated with the selected warehouse node.

21. The method of claim 17, wherein the service level parameters include one or more of a shipping cost or a customer segment.

22. The method of claim 17, wherein selecting the set of warehouse nodes further comprises ranking identified warehouse nodes.

23. The method of claim 17, wherein the placement request does not include a selection of a warehouse node from the merchant.

24. The method of claim 17, wherein the placement request does not include a selection of a warehouse node location from the merchant.

25. The method of claim 17, wherein the placement request does not include a selection of a carrier from the merchant.

26. The method of claim 17, wherein the placement instructions are provided to the merchant.

27. The method of claim 17, wherein the placement instructions are provided to a warehouse manager.

28. A non-transitory computer-readable medium containing instructions configured to cause one or more processors to perform a method for apportioning inventory units to a plurality of warehouse node, the method comprising:

receiving, at a server and from a merchant computing device, a placement request for a set of inventory units from a merchant, the placement request including a plurality of service level parameters including a delivery region and a shipping speed;

receiving, from one or more warehouse nodes, warehouse node information, wherein the one or more warehouse nodes provide the warehouse node information in a non-standardized format;

converting, by the server, the non-standardized warehouse node information into a plurality of node data sets of a standardized format;

storing, at a database, the plurality of node data sets of the standardized format;

accessing, by the server, the database storing the plurality of node data sets, each node data set being associated with a warehouse node, wherein each node data set includes availability information and carrier information for the warehouse node;

selecting, by the server and based on the node data sets and the service level parameters, a set of warehouse nodes for storing the inventory units, wherein the selecting includes:

identifying, based on the availability information, one or more warehouse nodes having available space to store at least some of the inventory units, and identifying, based on the carrier information, one or more warehouse nodes associated with at least one carrier that ships from the warehouse node to the delivery region at the received shipping speed;

apportioning, by the server, a number of inventory units to each selected warehouse node;

providing, by the server and to one or more node devices via a communication network, placement instructions including the selected warehouse nodes and the number of inventory units to ship to each selected warehouse node;

identifying, by the server, an inventory threshold for at least one warehouse node of the selected warehouse nodes;

determining, by the server, whether an inventory level for the at least one warehouse node has fallen below the identified inventory threshold for that warehouse node; and in response to determining that the inventory level for the at least one warehouse node of the selected warehouse nodes has fallen below the identified inventory threshold for that warehouse node, automatically triggering reapportionment of at least some of the inventory units by the server, wherein reapportionment of the at least some of the inventory units includes providing other placement instructions from the server via the communication network to the one or more node devices for the at least some of the inventory units, and wherein the other placement instructions are different from the provided placement instructions.

29. A non-transitory computer-readable medium containing instructions configured to cause one or more processors to perform a method for apportioning inventory units to a plurality of warehouse node, the method comprising:

receiving, at a server and from a computing device, a placement request for a set of inventory units from a merchant, the placement request including a plurality of service level parameters including a delivery region and a shipping speed;

receiving, from one or more warehouse nodes, warehouse node information, wherein the one or more warehouse nodes provide the warehouse node information in a non-standardized format;

converting, by the server, the non-standardized warehouse node information into a plurality of node data sets of a standardized format;
storing, at a database, the plurality of node data sets of the standardized format;
accessing, by the server, the database storing the plurality of node data sets, each node data set being associated with a warehouse node, wherein each node data set includes availability information and carrier information for the warehouse node;
selecting, by the server and based on the node data sets and the service level parameters, a set of warehouse nodes for storing the inventory units, wherein the selecting includes:
- identifying, based on the availability information, one or more warehouse nodes having available space to store at least some of the inventory units, and
- identifying, based on the carrier information, one or more warehouse nodes associated with at least one carrier that ships from the warehouse node to the delivery region at the received shipping speed;

apportioning, by the server, a number of inventory units to each selected warehouse node;
providing, by the server and to at least one node device, placement instructions including the selected warehouse nodes and the number of inventory units to ship to each selected warehouse node via a communication network;
determining, by the server, an inventory threshold for at least one warehouse node of the selected warehouse nodes;
determining, by the server, whether an inventory level for the at least one warehouse node has fallen below the determined inventory threshold for that warehouse node; and
automatically reapportioning, by the server, at least some inventory units between the selected warehouse nodes without instructions from the merchant and in response to determining that the inventory level for the at least one warehouse node has fallen below the determined inventory threshold for that warehouse node,
- wherein other placement instructions are provided by the server via the communication network and to the at least one node device, the other placement instructions being different from the provided placement instructions.

* * * * *